(12) United States Patent
Krishnan

(10) Patent No.: US 10,055,641 B2
(45) Date of Patent: Aug. 21, 2018

(54) CAUSATION OF RENDERING OF INFORMATION INDICATIVE OF A PRINTED DOCUMENT INTERACTION ATTRIBUTE

(71) Applicant: Nokia Technologies Oy, Espoo (FI)

(72) Inventor: Praveen Krishnan, Sunnyvale, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/109,598

(22) PCT Filed: Jan. 23, 2014

(86) PCT No.: PCT/US2014/012829
§ 371 (c)(1),
(2) Date: Jul. 1, 2016

(87) PCT Pub. No.: WO2015/112151
PCT Pub. Date: Jul. 30, 2015

(65) Prior Publication Data
US 2016/0328607 A1   Nov. 10, 2016

(51) Int. Cl.
*G06K 9/62* (2006.01)
*G06K 9/00* (2006.01)
(Continued)

(52) U.S. Cl.
CPC ........... *G06K 9/00456* (2013.01); *G06F 7/00* (2013.01); *G06F 17/30* (2013.01);
(Continued)

(58) Field of Classification Search
None
See application file for complete search history.

(56) References Cited

U.S. PATENT DOCUMENTS 8,418,055 B2    4/2013  King et al.
2002/0101510 A1  8/2002  Basson et al.
(Continued)

FOREIGN PATENT DOCUMENTS

EP    3097475 A1    11/2016
WO   2015/112151 A1   7/2015

OTHER PUBLICATIONS

International Search Report and Written Opinion received for corresponding Patent Cooperation Treaty Application No. PCT/US2014/012829, dated May 14, 2014, 10 pages.
(Continued)

*Primary Examiner* — Manav Seth
*Assistant Examiner* — David Perlman
(74) *Attorney, Agent, or Firm* — Alston & Bird LLP

(57) ABSTRACT

A method comprising receipt of visual information from a camera module, determination that the visual information comprises visual information indicative of a printed document that is being read by a user, determination of a printed document identifier that identifies the printed document based, at least in part, on the visual information, determination that the printed document identifier corresponds with a historical printed document record, retrieval of at least one printed document interaction attribute associated with the printed document identifier from the historical printed document record, and causation of rendering of information indicative of the printed document interaction attribute is disclosed.

20 Claims, 12 Drawing Sheets

(51) Int. Cl.
*G06F 7/00* (2006.01)
*G06F 17/30* (2006.01)
(52) U.S. Cl.
CPC .. *G06F 17/30014* (2013.01); *G06F 17/30253* (2013.01); *G06F 17/30899* (2013.01); *G06F 17/30902* (2013.01)

(56) References Cited

U.S. PATENT DOCUMENTS

| | | | |
|---|---|---|---|
| 2006/0029296 A1* | 2/2006 | King | H04N 1/00244 382/313 |
| 2007/0165904 A1* | 7/2007 | Nudd | G06Q 20/20 382/100 |
| 2007/0280534 A1* | 12/2007 | Foss | G06K 9/20 382/182 |
| 2011/0063404 A1 | 3/2011 | Raffle et al. | |
| 2011/0307842 A1 | 12/2011 | Chiang et al. | |
| 2011/0320935 A1 | 12/2011 | Piersol et al. | |
| 2012/0042288 A1 | 2/2012 | Liao et al. | |
| 2012/0246079 A1 | 9/2012 | Wilson et al. | |
| 2012/0284605 A1 | 11/2012 | Sitrick et al. | |
| 2013/0083064 A1* | 4/2013 | Geisner | G06F 17/30047 345/633 |
| 2016/0328607 A1 | 11/2016 | Krishnan | |

OTHER PUBLICATIONS

Rhodes, "The Wearable Remembrance Agent: a System for Augmented Memory", Proceedings of the 1st IEEE International Symposium on Wearable Computers, 1997, pp. 123-128.
Raffle et al., "Family Story Play: Reading with Young Children (and Elmo) Over a Distance", Proceedings of the SIGCHI Conference on Human Factors in Computing Systems, 2010, pp. 1583-1592.
"A Tale of Two Cities", Project Gutenberg EBook, Nov. 28, 2014, pp. 1-228.
Office action received for corresponding Canadian Patent Application No. 2935492, dated Feb. 20, 2017, 4 pages.
Extended European Search Report received for corresponding European Patent Application No. 14879721.0, dated May 18, 2017, 6 pages.
Renita-Machado, unknown title, correspondence dated Nov. 23, 2013.
Office action received for corresponding Canadian Patent Application No. 2,935,492, dated Jan. 31, 2018, 4 pages.
Office Action for corresponding European Application No. 148797210.0 dated May 23, 2018, 6 pages.

* cited by examiner

CAUSATION OF RENDERING OF INFORMATION INDICATIVE OF A PRINTED DOCUMENT INTERACTION ATTRIBUTE

RELATED APPLICATION

This application was originally filed as PCT Application No. PCT/US2014/012829 filed Jan. 23, 2014.

TECHNICAL FIELD

The present application relates generally to printed document interaction attributes.

BACKGROUND

As electronic apparatus become more prevalent and pervasive, users of electronic apparatus have become increasingly dependent on their electronic apparatus in order to assist them with every day activities. In many situations, a user may desire to read a printed document. Although the user may have access to an electronic apparatus capable of rendering a printed document, the user may desire to read a physical printed document. In such situations, it may be desirable to configure the user's electronic apparatus such that the electronic apparatus may assist the user with reading of the printed document in a manner that is convenient and intuitive.

SUMMARY

Various aspects of examples of the invention are set out in the claims.

One or more embodiments may provide an apparatus, a computer readable medium, a non-transitory computer readable medium, a computer program product, and a method for receipt of visual information from a camera module, determination that the visual information comprises visual information indicative of a printed document that is being read by a user, determination of a printed document identifier that identifies the printed document based, at least in part, on the visual information, determination that the printed document identifier corresponds with a historical printed document record, retrieval of at least one printed document interaction attribute associated with the printed document identifier from the historical printed document record, and causation of rendering of information indicative of the printed document interaction attribute.

One or more embodiments may provide an apparatus, a computer readable medium, a computer program product, and a non-transitory computer readable medium having means for receipt of visual information from a camera module, means for determination that the visual information comprises visual information indicative of a printed document that is being read by a user, means for determination of a printed document identifier that identifies the printed document based, at least in part, on the visual information, means for determination that the printed document identifier corresponds with a historical printed document record, means for retrieval of at least one printed document interaction attribute associated with the printed document identifier from the historical printed document record, and means for causation of rendering of information indicative of the printed document interaction attribute.

In at least one example embodiment, the printed document interaction attribute comprises a printed document interaction attribute type and a printed document interaction attribute value.

In at least one example embodiment, the retrieval of the printed document interaction attribute comprises retrieval of the printed document interaction attribute type and the printed document interaction attribute value.

In at least one example embodiment, the causation of rendering of information indicative of the printed document interaction attribute comprises causation of rendering of information indicative of the printed document interaction attribute type and information indicative of the printed document interaction attribute value.

One or more example embodiments further perform determination that the visual information comprises visual information indicative of a printed document that is being read by a user, determination of a printed document identifier that identifies the printed document based, at least in part, on the visual information, determination that the printed document identifier fails to correspond with a historical printed document record, determination of at least one printed document interaction attribute associated with the printed document based, at least in part, on the visual information, causation of storage of information indicative of the printed document interaction attribute and the printed document identifier in a historical printed document record, and determination that the visual information comprises visual information indicative of the printed document no longer being read by the user.

One or more example embodiments further perform determination of another printed document interaction attribute associated with the printed document based, at least in part, on the visual information, and causation of storage of information indicative of the other printed document interaction attribute in the historical printed document record.

In at least one example embodiment, the determination of the other printed document interaction attribute comprises determination of a printed document interaction attribute type and a printed document interaction attribute value.

In at least one example embodiment, determination of the other printed document interaction attribute associated with the printed document comprises determination of textual information based, at least in part, on the visual information, determination that the textual information corresponds with at least one visual printed document interaction attribute type, and setting of at least one visual printed document interaction attribute value based, at least in part, on the textual information.

In at least one example embodiment, the determination that the textual information corresponds with the visual printed document interaction attribute type is based, at least in part, on a position of the textual information on the printed document.

In at least one example embodiment, the position is a header of the printed document, and the visual printed document interaction attribute type is a page printed document interaction attribute type.

In at least one example embodiment, the position is a footer of the printed document, and the visual printed document interaction attribute type is a page printed document interaction attribute type.

In at least one example embodiment, the position is a corner of the printed document, and the visual printed document interaction attribute type is a page printed document interaction attribute type.

In at least one example embodiment, the position is a margin of the printed document, and the visual printed document interaction attribute type is a page printed document interaction attribute type.

In at least one example embodiment, the position is a header of the printed document, and the visual printed document interaction attribute type is a notational printed document interaction attribute type.

In at least one example embodiment, the position is a footer of the printed document, and the visual printed document interaction attribute type is a notational printed document interaction attribute type.

In at least one example embodiment, the position is a margin of the printed document, and the visual printed document interaction attribute type is a notational printed document interaction attribute type.

In at least one example embodiment, the position is a position within primary text of the printed document, and the visual printed document interaction attribute type is a notational printed document interaction attribute type.

In at least one example embodiment, the determination that the textual information corresponds with the visual printed document interaction attribute type is based, at least in part, on a textual information style of the textual information on the printed document.

In at least one example embodiment, the textual information style is a typographical textual information style, and the visual printed document interaction attribute type is a page printed document interaction attribute type.

In at least one example embodiment, the textual information style is a numerical typographical textual information style, and the visual printed document interaction attribute type is a page printed document interaction attribute type.

In at least one example embodiment, the textual information style is a handwritten textual information style, and the visual printed document interaction attribute type is a notational printed document interaction attribute type.

One or more example embodiments further perform determination that the textual information is handwritten, wherein the visual printed document interaction attribute type is a notational printed document interaction attribute and determination that the textual information corresponds with the notational printed document interaction attribute is based, at least in part, on the determination that the textual information on the printed document is handwritten.

One or more example embodiments further perform determination that the textual information is highlighted, wherein the visual printed document interaction attribute type is a highlight notational printed document interaction attribute and determination that the textual information corresponds with the highlight notational printed document interaction attribute is based, at least in part, on the determination that the textual information on the printed document is highlighted.

One or more example embodiments further perform determination of a locational printed document interaction attribute that identifies a location of the user, and causation of storage of information indicative of the locational printed document interaction attribute in the historical printed document record.

One or more example embodiments further perform receipt of information indicative of a historical printed document record utilization input, wherein the receipt of visual information from the camera module is caused, at least in part, by the historical printed document record utilization input.

One or more example embodiments further perform receipt of information indicative of a historical printed document record utilization input, wherein the determination that the visual information comprises visual information indicative of the printed document that is being read by a user is caused, at least in part, by the historical printed document record utilization input.

One or more example embodiments further perform receipt of information indicative of a historical printed document record utilization input, wherein the determination of the printed document identifier that identifies the printed document is caused, at least in part, by the historical printed document record utilization input.

One or more example embodiments further perform receipt of information indicative of a historical printed document record utilization input, wherein the determination that the printed document identifier corresponds with the historical printed document record is caused, at least in part, by the historical printed document record utilization input.

One or more example embodiments further perform determination that a printed document reconfiguration has occurred, determination of another printed document interaction attribute associated with the printed document based, at least in part, on the visual information, and storage of information indicative of the other printed document interaction attribute in the historical printed document record.

In at least one example embodiment, determination that the printed document reconfiguration has occurred is based, at least in part, on visual information indicative of occurrence of the printed document reconfiguration.

In at least one example embodiment, the visual information is received from the camera module.

In at least one example embodiment, the determination that the printed document reconfiguration has occurred is based, at least in part, on sensor information indicative of occurrence of the printed document reconfiguration.

In at least one example embodiment, the determination that the printed document reconfiguration has occurred is based, at least in part, on motion information indicative of occurrence of the printed document reconfiguration.

In at least one example embodiment, the motion information is received from at least one motion sensor.

In at least one example embodiment, the determination that the printed document reconfiguration has occurred is based, at least in part, on auditory information indicative of occurrence of the printed document reconfiguration.

In at least one example embodiment, the auditory information is received from at least one auditory sensor.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
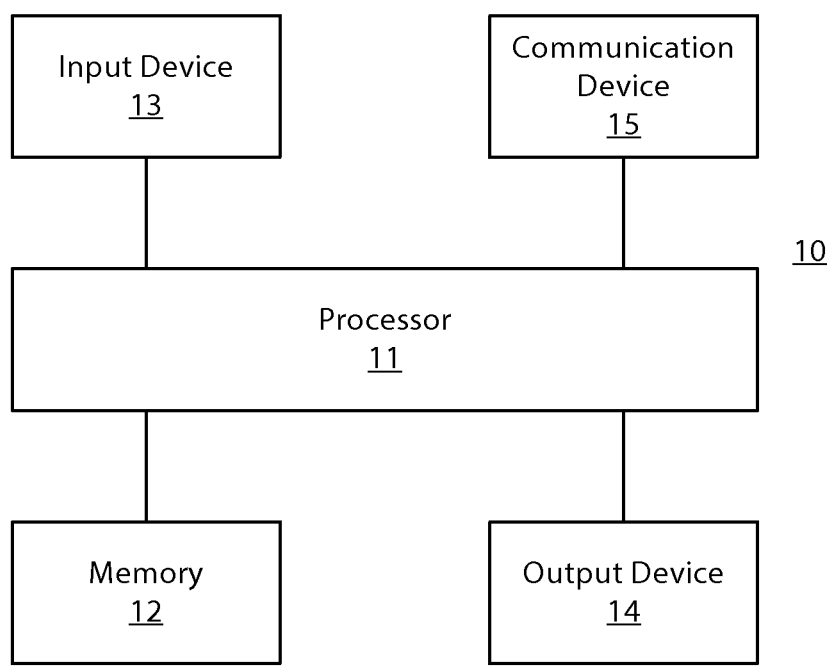
FIG. 1 is a block diagram showing an apparatus according to an example embodiment.

An embodiment of the invention and its potential advantages are understood by referring to FIGS. 1 through 11 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a wearable apparatus, a head mounted apparatus, a head mounted display, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
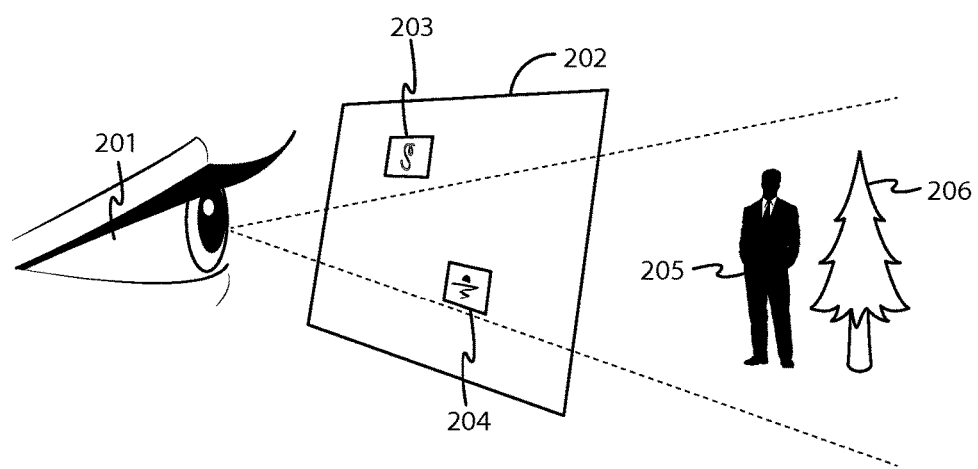
FIGS. 2A-2B are diagrams illustrating see through displays according to at least one example embodiment.

FIG. 2A is a diagram illustrating see through display 202 according to at least one example embodiment. In at least one example embodiment, displaying information on a see through display so that the information corresponds with one or more objects viewable through the see through display is referred to as augmented reality. In the example of FIG. 2A, user 201 may perceive objects 205 and 206 through see through display 202. In at least one example embodiment, the see through display may display information to the user. For example, display 202 may display information 203 and information 204. Information 203 and information 204 may be positioned on display 202 such that the information corresponds with one or more objects viewable through see through display 202, such as object 205. In such an example, information 203 may be associated with, identify, and/or the like, object 205. For example, information 203 may indicate an identity of object 205. In at least one example embodiment, display 202 may be comprised by a head mounted display.

Figure 2B:
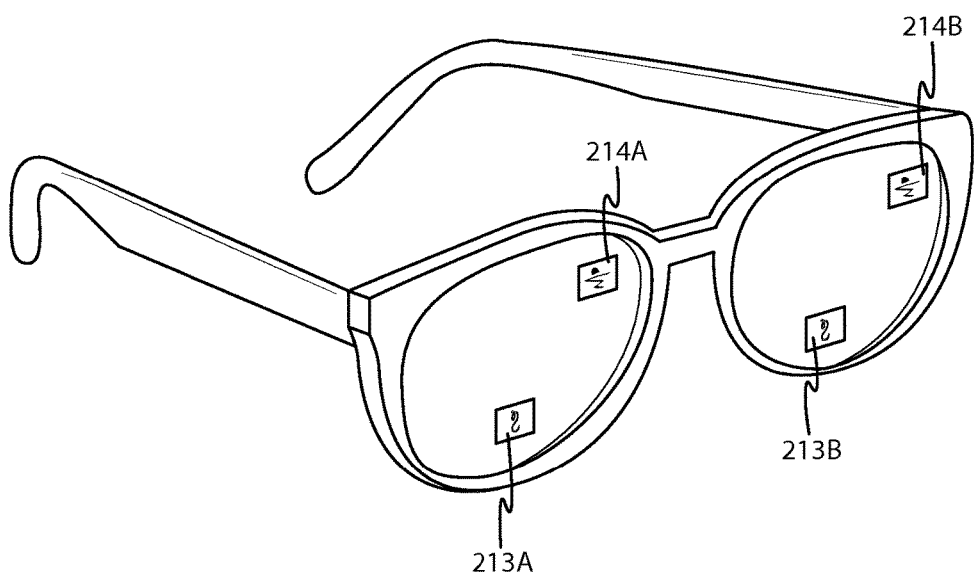

FIG. 2B is a diagram illustrating a see through display according to at least one example embodiment. In at least one example embodiment, a see through display is a near eye display. A near eye display may be a see through display that is positioned proximate to an eye of the user. The example of FIG. 2B illustrates glasses that comprise a near eye display in each lens. In the example of FIG. 2B, the right near eye display is displaying information 213A and 214A, and the left near eye display is displaying information 213B and 214B. In at least one example embodiment, information 213A may be associated with information 213B. For example, the content of information 213A may be identical to content of information 213B. In some circumstances, even though the content may be identical between 213A and 213B, position of information 213A on the right near eye display may vary from position of information 213B on the left near eye display. In this manner, the apparatus may vary position of information between the left near eye display and right near eye display to vary the parallax of the information perceived by the user. In this manner, the apparatus may vary the perceived depth of the information by the user.

Figure 3:
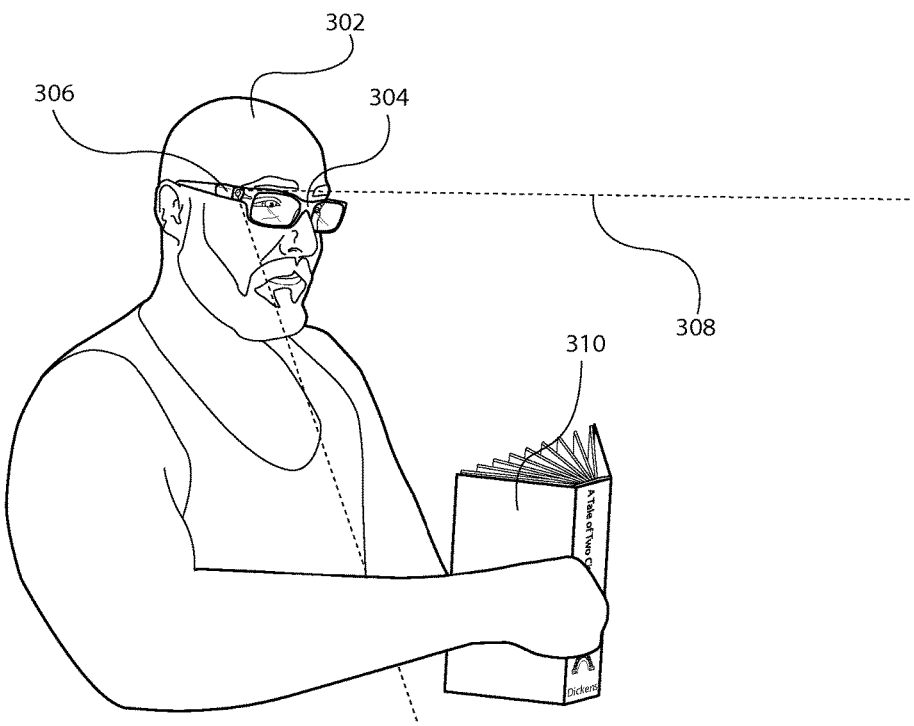
FIG. 3 is a diagram illustrating a user reading a printed document according to at least one example embodiment.

FIG. 3 is a diagram illustrating a user reading a printed document according to at least one example embodiment. The example of FIG. 3 is merely an example and does not limit the scope of the claims. For example, apparatus design may vary, apparatus configuration may vary, camera module configuration may vary, printed document configuration, user orientation may vary, printed document orientation may vary, and/or the like.

Many users enjoy reading books, magazines, and/or the like. For example, a user may enjoy reading a book before going to sleep at night, over a lunch break, and/or the like. In many situations, a user may prefer to read a physical printed document rather than a digital document, such as an electronic book, digital magazine, and/or the like. For example, the user may be more familiar with reading printed documents, may enjoy the physical connection the user may have with printed documents, may borrow a printed document from a friend, and/or the like. A printed document may be a book, a novel, a magazine, a newspaper, a journal, and/or the like.

In many situations, a user may read a printed publication over many discrete sessions, many days, many weeks, and/or the like. In such situations, the user may forget the user's place within the printed publication, the last page of the printed publication that the user read, the user's location the last time that the printed publication was read, and/or the like. For example, a user may begin reading a book that the user has not read before. For example, the user may receive a new book as a gift, and may desire to begin reading the book. In such an example, the user may read a portion of the book, and subsequently discontinue reading the book. In such an example, the user may desire to continue reading the book, but may not remember what page she read to previously, where within the printed document to continue reading, and/or the like. As such, it may be desirable to configure an apparatus such that a user may be reminded of information associated with prior interactions the user may have had with a printed publication, for example, a most recently read page, a location, and/or the like.

FIG. 3 is a diagram illustrating a user reading a printed document according to at least one example embodiment. In the example of FIG. 3, user 302 is reading printed document 310 while wearing head mounted display 304. As can be seen, printed document 310 is a book. In the example of FIG. 3, head mounted display 304 comprises camera module 306, associated with capture region 308. As illustrated in FIG. 3, printed document 310 is positioned such that printed document 310 is within capture region 308 of camera module 306.

In many circumstances, it may be desirable to configure an apparatus such that a user may pick up and read a printed document, and avoid unnecessary and/or cumbersome interactions with the apparatus. For example, it may be desirable to determine if the user is reading a printed document in a simple and intuitive manner. In at least one example embodiment, an apparatus receives visual information from a camera module. The camera module may be comprised by the apparatus, a separate apparatus, and/or the like. In at least one example embodiment, an apparatus determines that the visual information comprises visual information indicative of a printed document that is being read by a user. For example, the apparatus may receive visual information from a camera module that is comprised by the apparatus, and may determine that at least a portion of the visual information indicates that the user of the apparatus is reading the printed document. For example, the visual information may comprise visual information indicative of a printed document within a capture region of the camera module, indicative of a user holding a printed document such that the user is likely to be reading the printed document, and/or the like.

As illustrated in FIG. 3, printed document 310 is positioned such that printed document 310 is within capture region 308 of camera module 306. As such, the visual information received from camera module 306 comprises visual information indicative of the printed document. As illustrated in FIG. 3, user 302 is holding printed document 310 such that user 310 may be reading printed document 310. In the example of FIG. 3, capture region 308 of camera module 306 is oriented such that capture region 308 at least partially corresponds with a field of view of user 302. As such, the position and orientation of printed document 310 within capture region 308 may indicate that user 302 is reading printed document 310. In the example of FIG. 3, the determination that the visual information comprises visual information indicative of the printed document being read by the user is based, at least in part, on the visual information received from camera module 306 comprising visual information indicative of printed document 310.

In many circumstances, it may be desirable to determine when a user discontinues reading a printed document. In such circumstances, it may be desirable to determine if the user is no longer reading a printed document in a simple and intuitive manner. For example, it may be desirable to configure an apparatus such that performances one or more activities is based, at least in part, on a determination that a user began reading a printed publication, and subsequently discontinued reading the printed publication. In at least one example embodiment, an apparatus determines that the visual information comprises visual information indicative of the printed document no longer being read by the user. For example, the apparatus may receive visual information from a camera module that is comprised by the apparatus, and may determine that the visual information indicates that the user of the apparatus is no longer reading the printed document. For example, the visual information may fail to comprise visual information indicative of the printed document within the capture region of the camera module, indicative of a user holding the printed document such that the user is unlikely to be reading the printed document, and/or the like.

For example, as illustrated in FIG. 3, user 302 may desire to discontinue reading printed document 310. In such an example, user 310 may close printed document 310, may reorient printed document 310 such that user 302 is unlikely to be reading printed document 310, may reposition printed document 310 such that the position of printed document 310 fails to correspond with a position within capture region 308 of camera module 306, may reposition printed document 310 such that the visual information received from camera module 306 fails to comprise visual information indicative of printed document 310, and/or the like.

Figure 4:
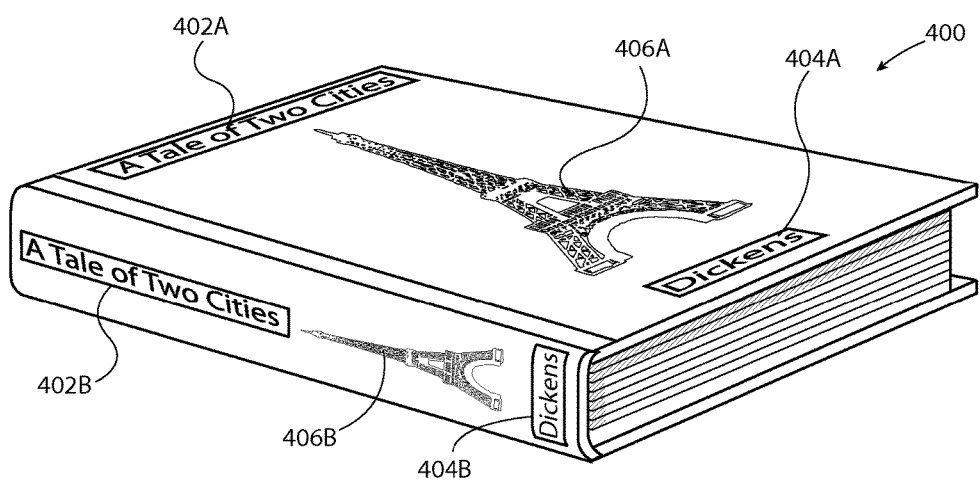
FIG. 4 is a diagram illustrating a printed document according to at least one example embodiment.

FIG. 4 is a diagram illustrating a printed document according to at least one example embodiment. The example of FIG. 4 is merely an example and does not limit the scope of the claims. For example, printed document type may vary, printed document identifiers may vary, printed document configuration may vary, and/or the like.

In many circumstances, it may be desirable to configure an apparatus such that a user may pick up and read a printed document, and avoid unnecessary and/or cumbersome interactions with the apparatus associated with identification of the printed document. For example, it may be desirable to determine an identity of a printed document in a simple and intuitive manner. In at least one example embodiment, an apparatus determines a printed document identifier that identifies the printed document. A printed document identifier may be any information that indicates an identity of the associated printed document. For example, the printed document identifier may be a title, an author, a chapter heading, graphical information printed on the printed document, textual information printed on the printed document, a barcode, an international standard book number, and/or the like.

The determination of the printed document identifier may be based, at least in part, on visual information received from a camera module. In at least one example embodiment, an apparatus determines a printed document identifier by way of optical character recognition. For example, a portion of the visual information received from the camera module may comprise visual information indicative of a title of the printed document. In such an example, the apparatus may determine the title of the printed document based, at least in part, on performance of optical character recognition in relation to the portion of the visual information. In another example, a portion of the visual information received from the camera module may comprise visual information indicative of artwork associated with the printed document. In such an example, the apparatus may determine a printed document identifier that identifies the printed document based, at least in part, on correspondence between the artwork and predetermined artwork associated with the printed document. There are many manners in which an apparatus may determine a printed document identifier that identifies a printed document, and there will likely be many more manners developed in the future. The manner in which the apparatus determines the printed document identifier does not necessarily limit the scope of the claims.

FIG. 4 is a diagram illustrating a printed document according to at least one example embodiment. The example of FIG. 4 illustrates printed document 400. In the example of FIG. 4, printed document 400 is the book "A Tale of Two Cities" by Charles Dickens. In the example of FIG. 4, printed document 400 comprises printed document identifiers 402A and 402B, printed document identifiers 404A and 404B, and printed document identifiers 406A and 406B. In the example of FIG. 4, printed document 400 may comprise one or more printed document identifiers in addition to the printed document identifiers illustrated. Printed document identifiers 402A, 404A, and 406A are positions on a front cover of printed document 400, and printed document identifiers 402B, 404B, and 406B are positions on a spine of printed document 400. In the example of FIG. 4, printed document identifiers 402A and 402B identify a title of printed document 400, printed document identifiers 404A and 404B identify an author of printed document 400, and printed document identifiers 406A and 406B identify artwork that may be associated with printed document 400. For example, printed document identifiers 402A and 402B identify the title of printed document 400 as "A Tale of Two Cities", printed document identifiers 404A and 404B identify the author of printed document 400 as "Dickens", and printed document identifiers 406A and 406B identify graphical information representative of the Eiffel Tower, which is a location associated with the text and story of printed document 400.

In the example of FIG. 4, printed document 400 may correspond with printed document 310 of FIG. 3. As such, printed document 400 may be held by user 302 of FIG. 3 at a position that corresponds with a position within capture region 308 of camera module 306 of FIG. 3. In such an example, head mounted display 304 of FIG. 3 may identify printed document 400 based, at least in part, on visual information received from camera module 306 of FIG. 3. For example, the visual information received from camera module 306 of FIG. 3 may comprise visual information indicative of printed document identifiers 402A, 402B, 404A, 404B, 406A, 406B, and/or the like. As such, head mounted display 304 of FIG. 3 may determine a printed document identifier that identifies printed document 400 based, at least in part, on printed document identifiers 402A, 402B, 404A, 404B, 406A, 406B, and/or the like. For example, head mounted display 304 of FIG. 3 may determine the printed document identifier to be "A Tale of Two Cities" based, at least in part, on printed document identifiers 402A, 402B, 404A, 404B, 406A, 406B, and/or the like.

Figure 5A:
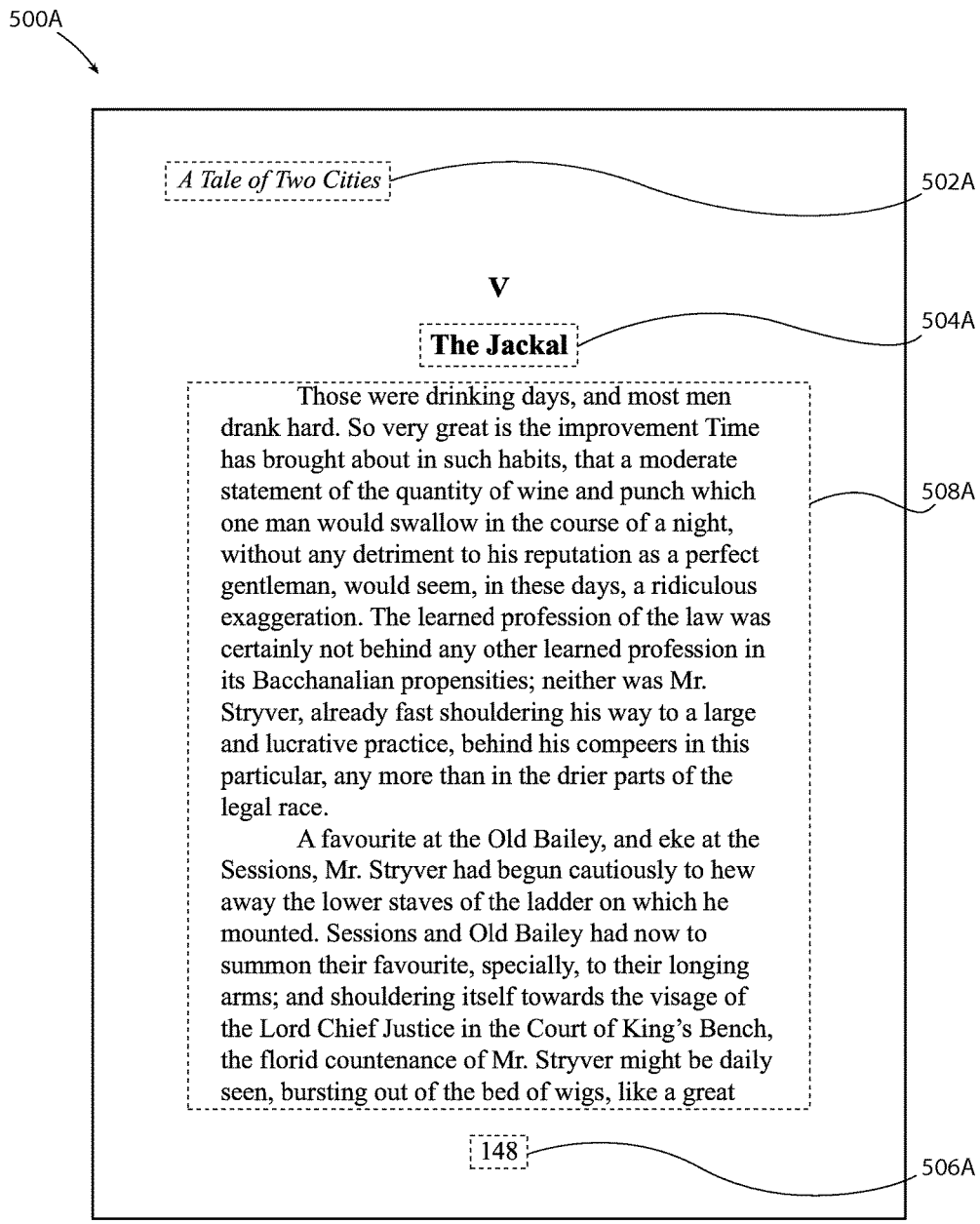
FIGS. 5A-5B are diagrams illustrating a printed document according to at least one example embodiment.
Figure 5B:
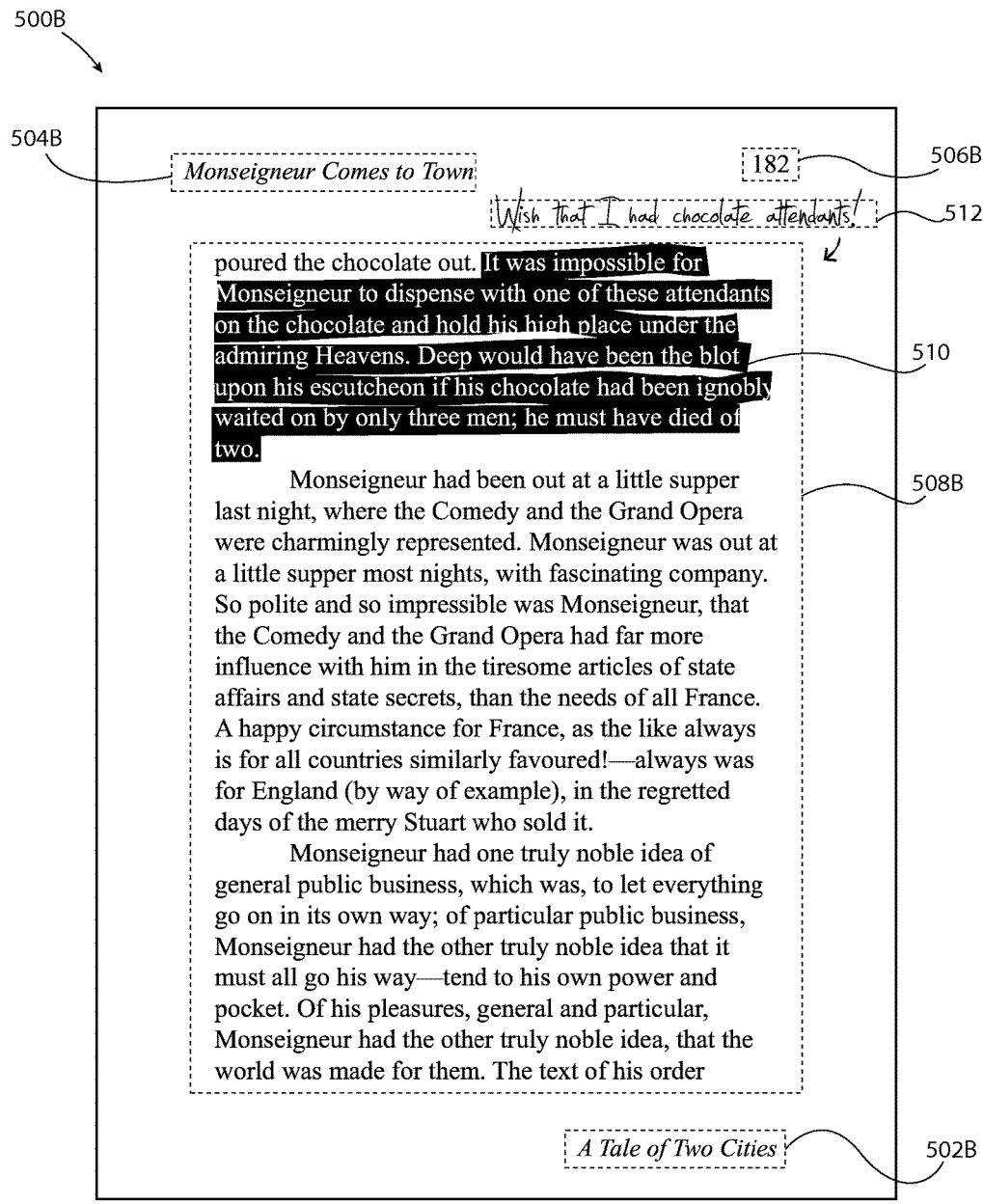

FIGS. 5A-5B are diagrams illustrating a printed document according to at least one example embodiment. The examples of FIGS. 5A-5B are merely examples and do not limit the scope of the claims. For example, printed document configuration may vary, printed document identifiers may vary, printed document interaction attributes may vary, and/or the like.

As previously discussed, in many situations, a user may read a printed publication over many discrete sessions, many days, many weeks, and/or the like. In such situations, the user may forget the user's place within the printed publication, the last page of the printed publication that the user read, the user's location the last time that the printed publication was read, and/or the like. As such, it may be desirable to configure an apparatus such that a user may be reminded of information associated with one or more prior interactions the user may have had with a printed publication, for example, a most recently read page, a location, and/or the like. In this matter, it may be desirable to configure the apparatus such that the apparatus may determine one or more attributes associated with the user's interactions with the printed document.

In at least one example embodiment, an apparatus determines at least one printed document interaction attribute associated with a printed document. The printed document interaction attribute may comprise information indicative of a user interaction with a printed document. The determination of the printed document interaction attribute may be based, at least in part, on visual information received from a camera module. In at least one example embodiment, a printed document interaction attribute determinable by way of visual information indicative of the printed document is a visual printed document interaction attribute.

In many situations, it may be desirable to categorize a type of printed document interaction attribute, as well as a value associated with the printed document interaction attribute. In at least one example embodiment, the printed document interaction attribute comprises a printed document interaction attribute type and a printed document interaction attribute value. For example, the printed document interaction attribute type may be a page printed document interaction attribute associated with a book, and the printed document interaction attribute value may indicate a page identifier, a most recent page identifier, a most recently read page identifier, and/or the like. In another example, the printed document interaction attribute type may be a notational printed document interaction attribute that may indicate a notation made by the user with respect to the printed document, the portion of the printed document, and/or the like. In at least one example embodiment, determination of the printed document interaction attribute associated with the printed document comprises determination of textual information based, at least in part, on the visual information. The textual information may be determined by way of optical text recognition. In such an example embodiment, the apparatus may determine that the textual information corresponds with at least one visual printed document interaction attribute type. In such an example embodiment, the apparatus may cause setting of at least one visual printed document interaction attribute value based, at least in part, on the textual information.

In many circumstances, a user that is reading a printed document may desire to make notations in the printed document. For example, the user may desire to make a note in the printed document, to highlight a portion of the primary text of the printed document, to underline a portion of the primary text of the printed document, and/or the like. In such an example, the user may desire to call out a portion of the primary text because the user particularly enjoys the portion of the primary text, the user may desire to make a notation for reasons relating to further review and/or research, and/or the like. As such, it may be desirable to determine one or more printed document interaction attributes that indicate such notations a user may make on a printed document. For example, a notational printed document interaction attribute may be a highlight notational printed document interaction attribute, an underline notational printed document interaction attribute, a textual notational printed document interaction attribute, and/or the like.

A highlight notational printed document interaction attribute type may indicate that at least a portion of the primary text of the printed document has been highlighted, and the highlight notational printed document interaction attribute value may indicate the text associated with portion of the primary text of the printed document that is highlighted. For example, a user may highlight a portion of the primary text of a printed document. In such an example, the printed document interaction attribute type may be a highlight notational printed document interaction attribute, and the highlight notational printed document interaction attribute value may be the portion of the primary text that is highlighted.

An underline notational printed document interaction attribute type may indicate that at least a portion of the primary text of the printed document has been underlined, and the underline notational printed document interaction attribute value may indicate the text associated with portion of the primary text of the printed document that is underlined. For example, a user may underline a portion of the primary text of a printed document. In such an example, the printed document interaction attribute type may be an underline notational printed document interaction attribute, and the underline notational printed document interaction attribute value may be the portion of the primary text that is underlined.

A textual notational printed document interaction attribute type may indicate that textual information and/or graphical information has been added to the printed document by a user, a different user, etc., and the textual notational printed document interaction attribute value may indicate at least the textual information that has been added to the printed document. For example, a user may jot a note reading "This is important" in a margin of the printed document. In such an example, the note may be a textual notational printed document interaction attribute, and the textual notational printed document interaction attribute value may "This is important".

FIG. 5A is a diagram illustrating a printed document according to at least one example embodiment. The example of FIG. 5A depicts a portion of printed document 500A. Printed document 500A comprises printed document identifier 502A, printed document identifier 504A, page printed document interaction attribute 506A, and primary text 508A.

FIG. 5B is a diagram illustrating a printed document according to at least one example embodiment. The example of FIG. 5B depicts a portion of printed document 500B. Printed document 500B comprises printed document identifier 502B, printed document identifier 504B, page printed document interaction attribute 506B, and primary text 508B. In the example of FIG. 5B, printed document 500B also comprises highlight notational printed document interaction attribute 510 and textual notational printed document interaction attribute 512.

In many circumstances, a printed document may position various elements associated with the printed document within certain predefined regions, near specific predetermined regions of the printed document, in accordance with industry standard, at customary locations with respect to the type of printed document, and/or the like. For example, a printed document interaction attribute that is positioned in the center of a footer of a printed document may likely be a page identifier. In another example, a printed document interaction attribute associated that is positioned in the center of a header of a printed document may likely be a printed document identifier. In yet another example, a printed document interaction attribute associated that is positioned at a position corresponding with the primary text of a printed document may likely be a notational printed document interaction attribute.

In at least one example embodiment, the determination that the textual information corresponds with the visual printed document interaction attribute type is based, at least in part, on a position of the textual information on the printed document. In at least one example embodiment, the position is a header of the printed document, and the visual printed document interaction attribute type is a page printed document interaction attribute type. In at least one example embodiment, the position is a footer of the printed document, and the visual printed document interaction attribute type is a page printed document interaction attribute type. In at least one example embodiment, the position is a corner of the printed document, and the visual printed document interaction attribute type is a page printed document interaction attribute type. In at least one example embodiment, the position is a margin of the printed document, and the visual printed document interaction attribute type is a page printed document interaction attribute type. For example, page printed document interaction attribute 506A is located at a position that is centered within a footer of printed document 500A of FIG. 5A. In the example of FIG. 5A, page printed document interaction attribute 506A may be determined to indicate a page identifier based, at least in part, on the position of page printed document interaction attribute 506A in relation to printed document 500A.

In at least one example embodiment, the position is a header of the printed document, and the visual printed document interaction attribute type is a notational printed document interaction attribute type. In at least one example embodiment, the position is a footer of the printed document, and the visual printed document interaction attribute type is a notational printed document interaction attribute type. In at least one example embodiment, the position is a margin of the printed document, and the visual printed document interaction attribute type is a notational printed document interaction attribute type. In at least one example embodiment, the position is a position within primary text of the printed document, and the visual printed document interaction attribute type is a notational printed document interaction attribute type. For example, textual notational printed document interaction attribute 512 is located at a position that is within a margin of printed document 500B of FIG. 5B. In the example of FIG. 5B, textual notational printed document interaction attribute 512 may be determined to indicate a textual notation based, at least in part, on the position of textual notational printed document interaction attribute 512 in relation to printed document 500B.

In many circumstances, a printed document may comprise one or more types of textual information. For example, a printed document interaction attribute that is purely numerical may likely be a page identifier, for example, a page number. In another example, a printed document interaction attribute associated that is purely alphabetical and positioned in the center of a header of a printed document may likely be a printed document identifier, for example, a title of a book. In many circumstances, different types of printed document interaction attributes may be distinguishable based, at least in part, on a textual information style. For example, a textual information style may be a typographical textual information style, a handwritten textual information style, a numerical typographical textual information style, an alphabetical typographical textual information style, and/or the like. For example, a printed document interaction attribute may be associated with a handwritten textual information style. In such an example, the printed document interaction attribute is less likely to be a page identifier, a printed document identifier, and/or the like. In such an example, the printed document interaction attribute is more likely to be a notational printed document interaction attribute, a highlight notational printed document interaction attribute, an underline notational printed document interaction attribute, a textual notational printed document interaction attribute, and/or the like.

In at least one example embodiment, the determination that the textual information corresponds with the visual printed document interaction attribute type is based, at least in part, on a textual information style of the textual information on the printed document. For example, the textual information style may be a typographical textual information style, and the visual printed document interaction attribute type may be a page printed document interaction attribute type. In another example, the textual information style may be a numerical typographical textual information style, and the visual printed document interaction attribute type is a page printed document interaction attribute type. In yet another example, the textual information style may be a handwritten textual information style, and the visual printed document interaction attribute type is a notational printed document interaction attribute type. In such an example, the notational printed document interaction attribute type may be a highlight notational printed document interaction attribute type, an underline notational printed document interaction attribute type, a textual notational printed document interaction attribute type, and/or the like. For example, as illustrated in FIG. 5A, page printed document interaction attribute 506A is depicted in a numerical typographical textual information style. In the example of FIG. 5A, page printed document interaction attribute 506A may be determined to indicate a page identifier based, at least in part, on the numerical typographical textual information style.

In at least one example embodiment, an apparatus determines that textual information is handwritten. In such an example embodiment, the visual printed document interaction attribute type may be a notational printed document interaction attribute. In such an example embodiment, determination that the textual information corresponds with the notational printed document interaction attribute may be based, at least in part, on the determination that the textual information on the printed document is handwritten. There are many manners in which an apparatus may determine that the textual information is handwritten, and there will likely be many more manners developed in the future. The manner in which the apparatus determines that the textual information is handwritten does not necessarily limit the scope of the claims. For example, as illustrated in FIG. 5B, textual notational printed document interaction attribute 512 is depicted in a handwritten textual information style. In the example of FIG. 5B, textual notational printed document interaction attribute 512 may be determined to indicate a textual notation based, at least in part, on the handwritten textual information style.

In at least one example embodiment, an apparatus determines that textual information is highlighted. In such an example embodiment, the visual printed document interaction attribute type may be a highlight notational printed document interaction attribute. In such an example embodiment, determination that the textual information corresponds with the highlight notational printed document interaction attribute may be based, at least in part, on the determination that the textual information on the printed document is highlighted. Determination that the textual information on the printed document is highlight may be based, at least in part, on a color of the textual information, a background color associated with the textual information, and/or the like. There are many manners in which an apparatus may determine that the textual information is highlighted, and there will likely be many more manners developed in the future. The manner in which the apparatus determines that the textual information is highlighted does not necessarily limit the scope of the claims. For example, as illustrated in FIG. 5B, a user has highlighted a portion of primary text 508B indicated by highlight notational printed document interaction attribute 510. In the example of FIG. 5B, highlight notational printed document interaction attribute 510 may be determined to indicate a highlighted portion of printed document 500B based, at least in part, on visual information indicative of the portion of printed document 500B being highlighted.

In at least one example embodiment, an apparatus determines that textual information is underlined. In such an example embodiment, the visual printed document interaction attribute type may be an underline notational printed document interaction attribute. In such an example embodiment, determination that the textual information corresponds with the underline notational printed document interaction attribute may be based, at least in part, on the determination that the textual information on the printed document is underlined. Determination that the textual information on the printed document is underlined may be based, at least in part, on the presence of a handwritten underscore proximate to the textual information, a color of an underscore proximate to the textual information, and/or the like. There are many manners in which an apparatus may determine that the textual information is underlined, and there will likely be many more manners developed in the future. The manner in which the apparatus determines that the textual information is underlined does not necessarily limit the scope of the claims.

In many situations, a user may begin reading a book that the user has not read before. For example, the user may receive a new book as a gift, and may desire to begin reading the book. In such an example, it may be desirable to store information associated with the printed document, the user's progress with respect to reading the printed document, and/or the like. For example, a user may begin reading a book, temporarily discontinue reading the book, and subsequently continue reading the book several days later. In such an example, the user may desire to be reminded of the user's place in the book, of any highlights the user may have made, of any comments the user may have scrawled into the margins of the printed document, and/or the like.

In circumstances in which the user begins reading a printed document that the user has not read before, the apparatus may determine that a printed document identifier that identifies the printed document fails to correspond with a historical printed document record. In such circumstances, the apparatus may cause storage of information indicative of a printed document interaction attribute and a printed document identifier in a historical printed document record. In this manner, the user's interactions with the printed document are stored in the historical printed document record for subsequent retrieval. In circumstances in which the user continues reading a printed document that the user has already read a portion of, the apparatus may determine that the printed document identifier corresponds with a historical printed document record. For example, the printed document identifier may correspond with a historical printed document identifier comprised by the historical printed document record. In such circumstances, the apparatus may retrieve at least one printed document interaction attribute associated with the printed document identifier from the historical printed document record. The retrieval of the printed document interaction attribute may comprise retrieval of the printed document interaction attribute type and the printed document interaction attribute value. For example, a user may continue reading a book. In such an example, the apparatus may determine a printed document identifier that identifies the book, and determine that the printed document identifier corresponds with a historical printed document record. As a result, the apparatus may retrieve a page printed document interaction attribute that is associated with a page identifier, a most recent page identifier, a most recently read page identifier, and/or the like. In this manner, the user may be reminded of where the user left off reading the book, a page number to turn to in order to continue reading the book, and/or the like. In this manner, a user of the apparatus may be reminded as to the user's prior interactions with the printed document.

In some situations, a user may desire to be reminded of where the user last read a printed document. In at least one example embodiment, an apparatus determines a locational printed document interaction attribute that identifies a location of the user. The locational printed document interaction attribute may be determined by way of a location sensor, a global positioning system sensor, wireless triangulation, and/or the like. In at least one example embodiment, the apparatus causes storage of information indicative of the locational printed document interaction attribute in the historical printed document record. In this manner, the apparatus may cause storage of information indicative of a location of a user while the user is reading a particular printed document.

In some circumstances, it may be desirable to determine one or more printed document interaction attributes associated with a printed document based, at least in part, on reconfiguration of the printed document. For example, as a user reads a printed document and progresses through the primary text of the printed document, the user may turn one or more pages of the printed document, may fold the printed document, flip the printed document, and/or the like. In at least one example embodiment, an apparatus determines that a printed document reconfiguration has occurred. In such an example embodiment, the apparatus may determine that the printed document reconfiguration has occurred is based, at least in part, on visual information indicative of occurrence of the printed document reconfiguration. The visual information may, for example, be received from a camera module. For example, the visual information may contain visual information indicative of a user turning a page of a printed document, reorienting the printed document, folding the printed document, flipping the printed document over, and/or the like. In at least one example embodiment, an apparatus determines a printed document interaction attribute associated with the printed document based, at least in part, on determination that the printed document has been reconfigured. In such an example embodiment, the apparatus may subsequently cause storage of information indicative of the printed document interaction attribute in the historical printed document record. For example, a user reading a book may turn from a first page to a second page. In such an example, the book has been reconfigured based, at least in part, on the user turning the page. In such an example, the user may determine a page printed document interaction attribute that indicates that the user is currently on the second page, and may cause storage of the page printed document interaction attribute in a historical printed document record associated with the book.

In at least one example embodiment, an apparatus determines that the printed document reconfiguration has occurred based, at least in part, on sensor information indicative of occurrence of the printed document reconfiguration. For example, the apparatus may determine that the printed document reconfiguration has occurred based, at least in part, on motion information indicative of occurrence of the printed document reconfiguration. In such an example, the motion information may be received from at least one motion sensor. For example, the motion information may comprise motion information indicative of a user turning a page of a printed document, reorienting the printed document, folding the printed document, flipping the printed document over, and/or the like.

In another example, the apparatus may determine that the printed document reconfiguration has occurred is based, at least in part, on auditory information indicative of occurrence of the printed document reconfiguration. In such an example, the auditory information may be received from at least one auditory sensor. For example, the auditory information may comprise auditory information indicative of a user turning a page of a printed document, reorienting the printed document, folding the printed document, flipping the printed document over, and/or the like.

FIGS. 6A-6D are diagrams illustrating information indicative of a printed document interaction attribute according to at least one example embodiment. The examples of FIGS. 6A-6D are merely examples and do not limit the scope of the claims. For example, display configuration may vary, display content may vary, printed document identifier may vary, printed document interaction attribute type may vary, printed document interaction attribute value may vary, and/or the like.

In many situations, a user may desire to be reminded of the user's prior interactions with a specific printed document. For example, the user may desire to configure the user's apparatus to determine information associated with the user's interactions with a printed document such that the user may be reminded of the user's most recently read page, of the location where the user last read a specific printed document, and/or the like. In this manner, it may be desirable to configure an apparatus such that a user of the apparatus may indicate a desire to utilize functionality associated with identification of a printed document, determination of one or more printed document interaction attributes, causation of storage of one or more printed document interaction attributes in a historical printed document record associated with a printed document identifier, and/or the like.

In at least one example embodiment, an apparatus receives information indicative of a historical printed document record utilization input. In at least one example embodiment, the receipt of visual information from the camera module is caused, at least in part, by the historical printed document record utilization input. In at least one example embodiment, the determination that the visual information comprises visual information indicative of the printed document that is being read by a user is caused, at least in part, by the historical printed document record utilization input. In at least one example embodiment, the determination of the printed document identifier that identifies the printed document is caused, at least in part, by the historical printed document record utilization input. In at least one example embodiment, the determination that the printed document identifier corresponds with the historical printed document record is caused, at least in part, by the historical printed document record utilization input.

In order to facilitate reminder of a user of prior interactions, it may be desirable to configure an apparatus such that the apparatus may render information indicative of one or more printed document interaction attributes associated with a historical printed document record and a printed document identifier. In at least one example embodiment, an apparatus causes rendering of information indicative of the printed document interaction attribute. For example, the apparatus may render the information indicative of the printed document interaction attribute, the apparatus may cause a separate apparatus to render the information indicative of the printed document interaction attribute, and/or the like. The apparatus may cause rendering of the information indicative of the printed document interaction attribute by way of a display, a speaker, a haptic feedback sensor, and/or the like. In at least one example embodiment, the causation of rendering of information indicative of the printed document interaction attribute comprises causation of rendering of information indicative of the printed document interaction attribute type and information indicative of the printed document interaction attribute value. For example, the apparatus may play an auditory cue that indicates that the most recently read page is page 312. In such an example, the printed document interaction attribute type is a page printed document interaction attribute, and the page printed document interaction attribute value is 312.

Figure 6A:
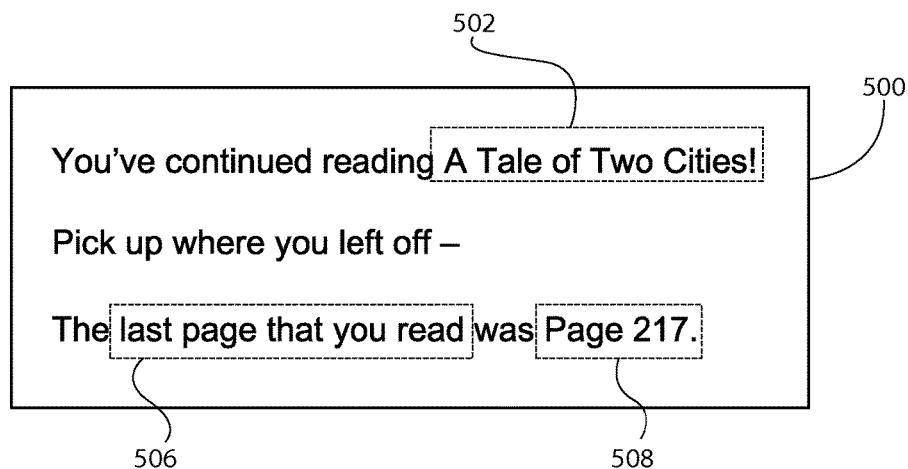
FIGS. 6A-6D are diagrams illustrating information indicative of a printed document interaction attribute according to at least one example embodiment.

FIG. 6A is a diagram illustrating information indicative of a printed document interaction attribute according to at least one example embodiment. In the example of FIG. 6A, display 500 is displaying information indicative of printed document identifier 502, printed document interaction attribute type 506, and printed document interaction attribute value 508. In the example of FIG. 6A, user 302 may have picked up "A Tale of Two Cities", as illustrated in the example of FIG. 3. For example, apparatus 304 of FIG. 3 may have determined a printed document identifier associated with printed document 310, for example, "A Tale of Two Cities". In such an example, apparatus 304 of FIG. 3 may have determined that the printed document identifier corresponded with a historical printed document record, and subsequently retrieved and rendered the information illustrated in the example of FIG. 6A. As such, user 302 of FIG. 3 may be reminded that the last page that the user read was page 217.

Figure 6B:
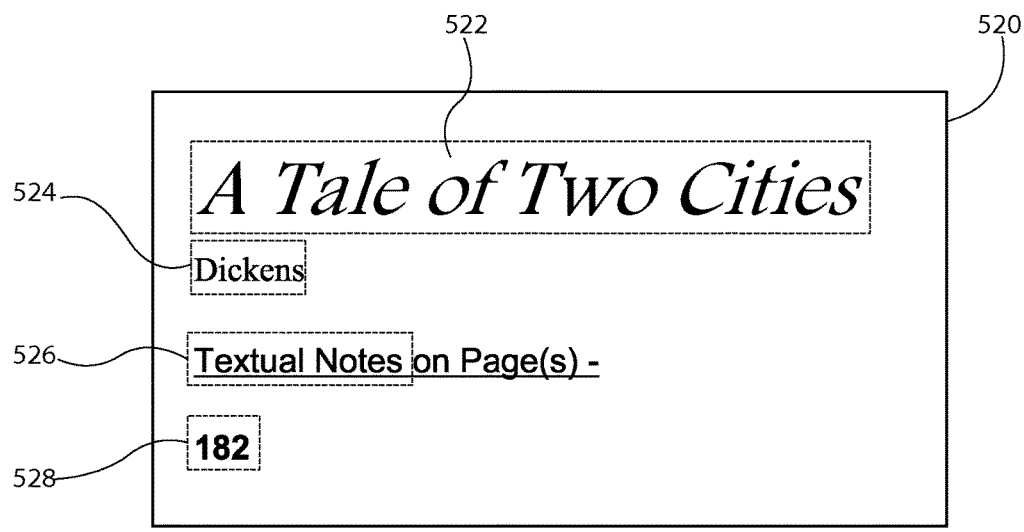

FIG. 6B is a diagram illustrating information indicative of a printed document interaction attribute according to at least one example embodiment. In the example of FIG. 6B, display 520 is displaying information indicative of printed document identifier 522, printed document interaction attribute type 526, and printed document interaction attribute value 528. In the example of FIG. 6B, user 302 may have picked up "A Tale of Two Cities", as illustrated in the example of FIG. 3. For example, apparatus 304 of FIG. 3 may have determined a printed document identifier associated with printed document 310, for example, "A Tale of Two Cities". In such an example, apparatus 304 of FIG. 3 may have determined that the printed document identifier corresponded with a historical printed document record, and subsequently retrieved and rendered the information illustrated in the example of FIG. 6B. For example, user 302 of FIG. 3 may have jotted down textual notational printed document interaction attribute 512 in the header of page 182 of printed document 500B, as illustrated in the example of FIG. 5B. As such, user 302 of FIG. 3 may be reminded that the user jotted down textual notes on page 182 of "A Tale of Two Cities" by Dickens. Although the example of FIG. 6B illustrates textual notational printed document interaction attribute value 528 to be a page identifier associated with the textual notational printed document interaction attribute, the textual notational printed document interaction attribute value may be the content of the textual notational printed document interaction attribute. For example, the textual notational printed document interaction attribute value may be "Wish that I had chocolate attendants!" as illustrated in the example of FIG. 5B.

Figure 6C:
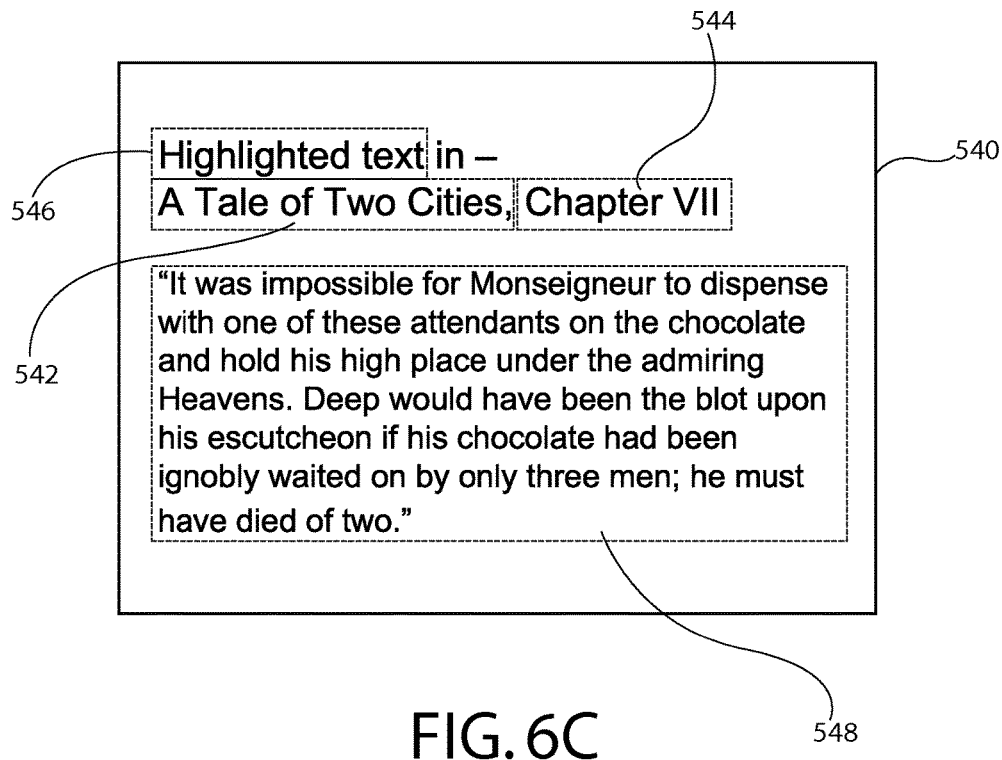

FIG. 6C is a diagram illustrating information indicative of a printed document interaction attribute according to at least one example embodiment. In the example of FIG. 6C, display 540 is displaying information indicative of printed document identifier 542, printed document identifier 544, printed document interaction attribute type 546, and printed document interaction attribute value 548. In the example of FIG. 6C, user 302 may have picked up "A Tale of Two Cities", as illustrated in the example of FIG. 3. For example, apparatus 304 of FIG. 3 may have determined a printed document identifier associated with printed document 310, for example, "A Tale of Two Cities". In such an example, apparatus 304 of FIG. 3 may have determined that the printed document identifier corresponded with a historical printed document record, and subsequently retrieved and rendered the information illustrated in the example of FIG. 6C. For example, user 302 of FIG. 3 may have highlighted a portion of primary text 508B, as indicated by highlight notational printed document interaction attribute 510, as illustrated in the example of FIG. 5B. As such, user 302 of FIG. 3 may be reminded that the user highlighted text in "Chapter VII" of "A Tale of Two Cities". Although the example of FIG. 6C illustrates highlight notational printed document interaction attribute value 528 to be the content of the highlight notational printed document interaction attribute, the highlight notational printed document interaction attribute value may be a page identifier associated with the highlight notational printed document interaction attribute. For example, the highlight notational printed document interaction attribute value may indicate that the highlighted portion of the primary text is located on page 182 of the printed document, as illustrated in the example of FIG. 5B.

Figure 6D:
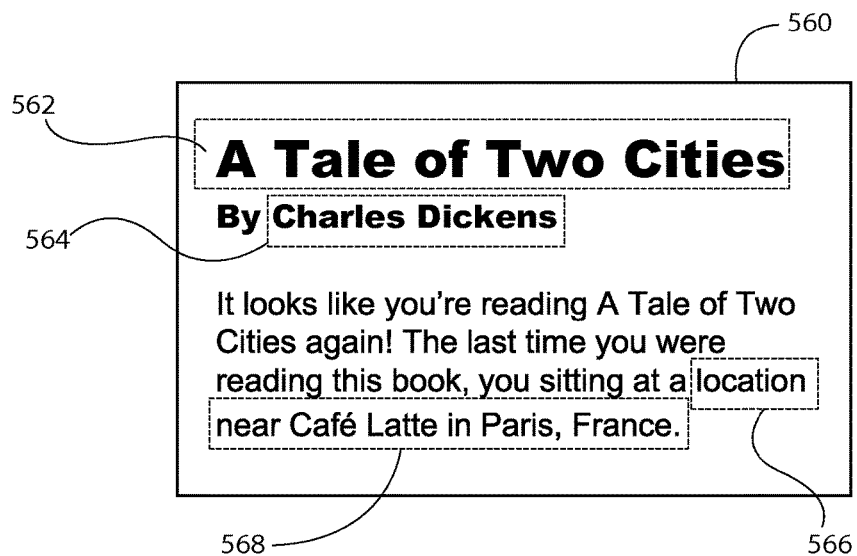

FIG. 6D is a diagram illustrating information indicative of a printed document interaction attribute according to at least one example embodiment. In the example of FIG. 6D, display 560 is displaying information indicative of printed document identifier 562, printed document identifier 564, printed document interaction attribute type 566, and printed document interaction attribute value 568. In the example of FIG. 6D, user 302 may have picked up "A Tale of Two Cities", as illustrated in the example of FIG. 3. For example, apparatus 304 of FIG. 3 may have determined a printed document identifier associated with printed document 310, for example, "A Tale of Two Cities". In such an example, apparatus 304 of FIG. 3 may have determined that the printed document identifier corresponded with a historical printed document record, and subsequently retrieved and rendered the information illustrated in the example of FIG. 6D. As such, user 302 of FIG. 3 may be reminded that the last time that the user was reading "A Tale of Two Cities", the user was at a location near Café Latte in Paris, France. In this manner, printed document interaction attribute type 566 is a locational printed document interaction attribute, and printed document interaction attribute value 568 indicates a most recent location associated with the user reading "A Tale of Two Cities".

Figure 7:
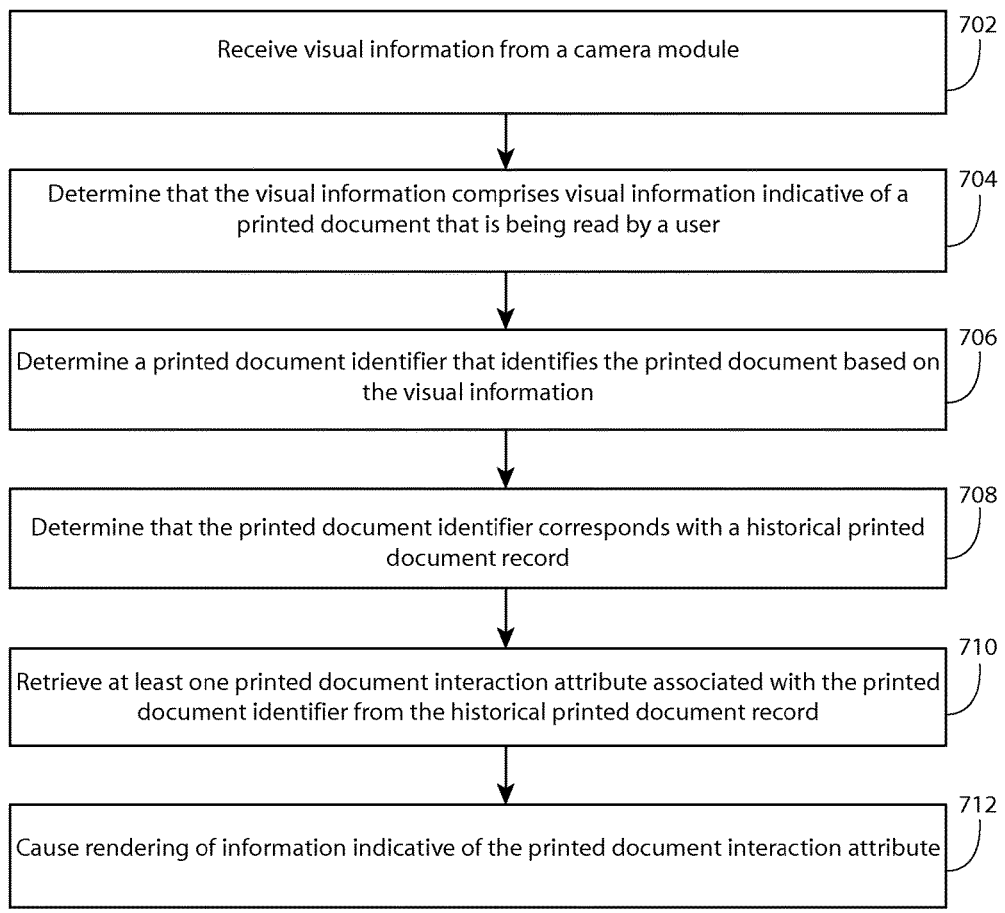
FIG. 7 is a flow diagram illustrating activities associated with causation of rendering of information indicative of a printed document interaction attribute according to at least one example embodiment.

FIG. 7 is a flow diagram illustrating activities associated with causation of rendering of information indicative of a printed document interaction attribute according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus receives visual information from a camera module. The receipt, the visual information, and the camera module may be similar as described regarding FIG. 2, FIG. 3, FIG. 4, and FIGS. 5A-5B.

At block 704, the apparatus determines that the visual information comprises visual information indicative of a printed document that is being read by a user. The determination, the printed document, the user, and the visual information indicative of the printed document being read by the user may be similar as described regarding FIG. 2, FIG. 3, FIG. 4, and FIGS. 5A-5B.

At block 706, the apparatus determines a printed document identifier that identifies the printed document based, at least in part, on the visual information. The determination and the printed document identifier FIG. 3, FIG. 4, and FIGS. 5A-5B.

At block 708, the apparatus determines that the printed document identifier corresponds with a historical printed document record. The determination and the historical printed document record may be similar as described regarding FIG. 3, FIG. 4, FIGS. 5A-5B, and FIGS. 6A-6D.

At block 710, the apparatus retrieves at least one printed document interaction attribute associated with the printed document identifier from the historical printed document record. The retrieval and the printed document interaction attribute may be similar as described regarding FIG. 3, FIG. 4, FIGS. 5A-5B, and FIGS. 6A-6D.

At block 712, the apparatus causes rendering of information indicative of the printed document interaction attribute. The causation, the rendering, and the information indicative of the printed document interaction attribute may be similar as described regarding FIG. 2, FIG. 3, FIG. 4, FIGS. 5A-5B, and FIGS. 6A-6D.

Figure 8:
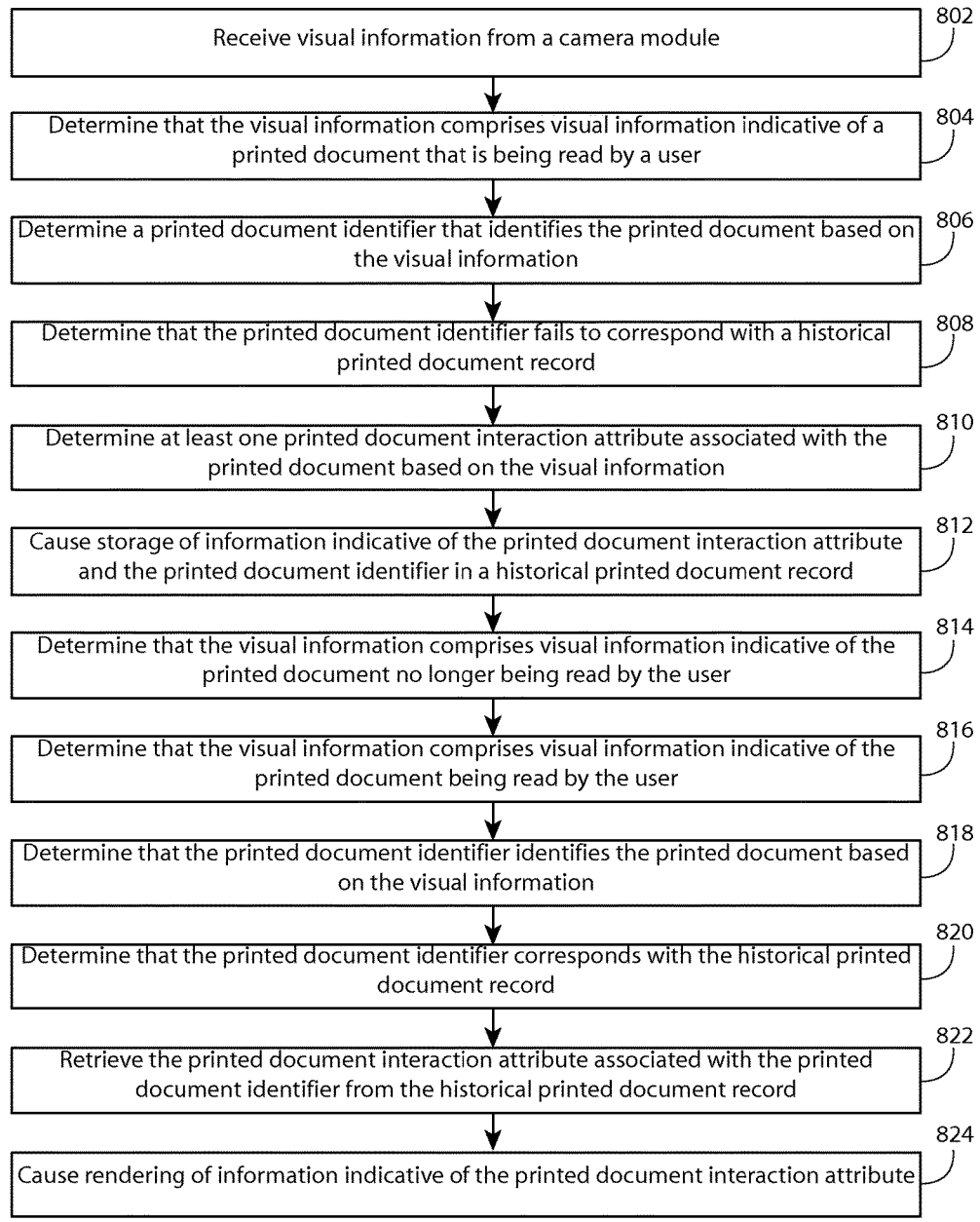
FIG. 8 is a flow diagram illustrating activities associated with causation of rendering of information indicative of a printed document interaction attribute according to at least one example embodiment.

FIG. 8 is a flow diagram illustrating activities associated with causation of rendering of information indicative of a printed document interaction attribute according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As discussed previously, in many situations, a user may begin reading a book that the user has not read before. For example, the user may receive a new book as a gift, and may desire to begin reading the book. In such an example, it may be desirable to cause storage of a printed document identifier that identifies the new book in a historical printed document record. It may also be desirable to cause storage of information indicative of one or more printed document interaction attributes associated with the new book. In such an example, the user may temporarily discontinue reading the book, and may later resume reading the book. As such, the user may desire to be reminded of information associated with the last interactions the user may have had with the book, for example, a most recently read page, a location, and/or the like.

At block 802, the apparatus receives visual information from a camera module. The receipt, the visual information, and the camera module may be similar as described regarding FIG. 2, FIG. 3, FIG. 4, and FIGS. 5A-5B.

At block 804, the apparatus determines that the visual information comprises visual information indicative of a printed document that is being read by a user. The determination, the printed document, the user, and the visual information indicative of the printed document being read by the user may be similar as described regarding FIG. 2, FIG. 3, FIG. 4, and FIGS. 5A-5B.

At block 806, the apparatus determines a printed document identifier that identifies the printed document based, at least in part, on the visual information. The determination and the printed document identifier FIG. 3, FIG. 4, and FIGS. 5A-5B.

At block 808, the apparatus determines that the printed document identifier fails to correspond with a historical printed document record. The determination and the historical printed document record may be similar as described regarding FIG. 3, FIG. 4, FIGS. 5A-5B, and FIGS. 6A-6D.

At block 810, the apparatus determines at least one printed document interaction attribute associated with the printed document based, at least in part, on the visual information. The determination and the printed document interaction attribute may be similar as described regarding FIG. 3, FIG. 4, FIGS. 5A-5B, and FIGS. 6A-6D.

At block 812, the apparatus causes storage of information indicative of the printed document interaction attribute and the printed document identifier in a historical printed document record. The causation, the storage, and the historical printed document record may be similar as described regarding FIG. 3, FIG. 4, FIGS. 5A-5B, and FIGS. 6A-6D.

At block 814, the apparatus determines that the visual information comprises visual information indicative of the printed document no longer being read by the user. The determination and the visual information indicative of the printed document no longer being read by the user may be similar as described regarding FIG. 2, FIG. 3, FIG. 4, and FIGS. 5A-5B.

At block 816, the apparatus determines that the visual information comprises visual information indicative of the printed document being read by the user. The determination and the visual information indicative of the printed document being read by the user may be similar as described regarding FIG. 2, FIG. 3, FIG. 4, and FIGS. 5A-5B.

At block 818, the apparatus determines that the printed document identifier identifies the printed document based, at least in part, on the visual information. The determination may be similar as described regarding FIG. 3, FIG. 4, and FIGS. 5A-5B.

At block 820, the apparatus determines that the printed document identifier corresponds with the historical printed document record. The determination may be similar as described regarding FIG. 3, FIG. 4, FIGS. 5A-5B, and FIGS. 6A-6D.

At block 822, the apparatus retrieves the printed document interaction attribute associated with the printed document identifier from the historical printed document record. The retrieval may be similar as described regarding FIG. 3, FIG. 4, FIGS. 5A-5B, and FIGS. 6A-6D.

At block 824, the apparatus causes rendering of information indicative of the printed document interaction attribute. The causation, the rendering, and the information indicative of the printed document interaction attribute may be similar as described regarding FIG. 2, FIG. 3, FIG. 4, FIGS. 5A-5B, and FIGS. 6A-6D.

Figure 9:
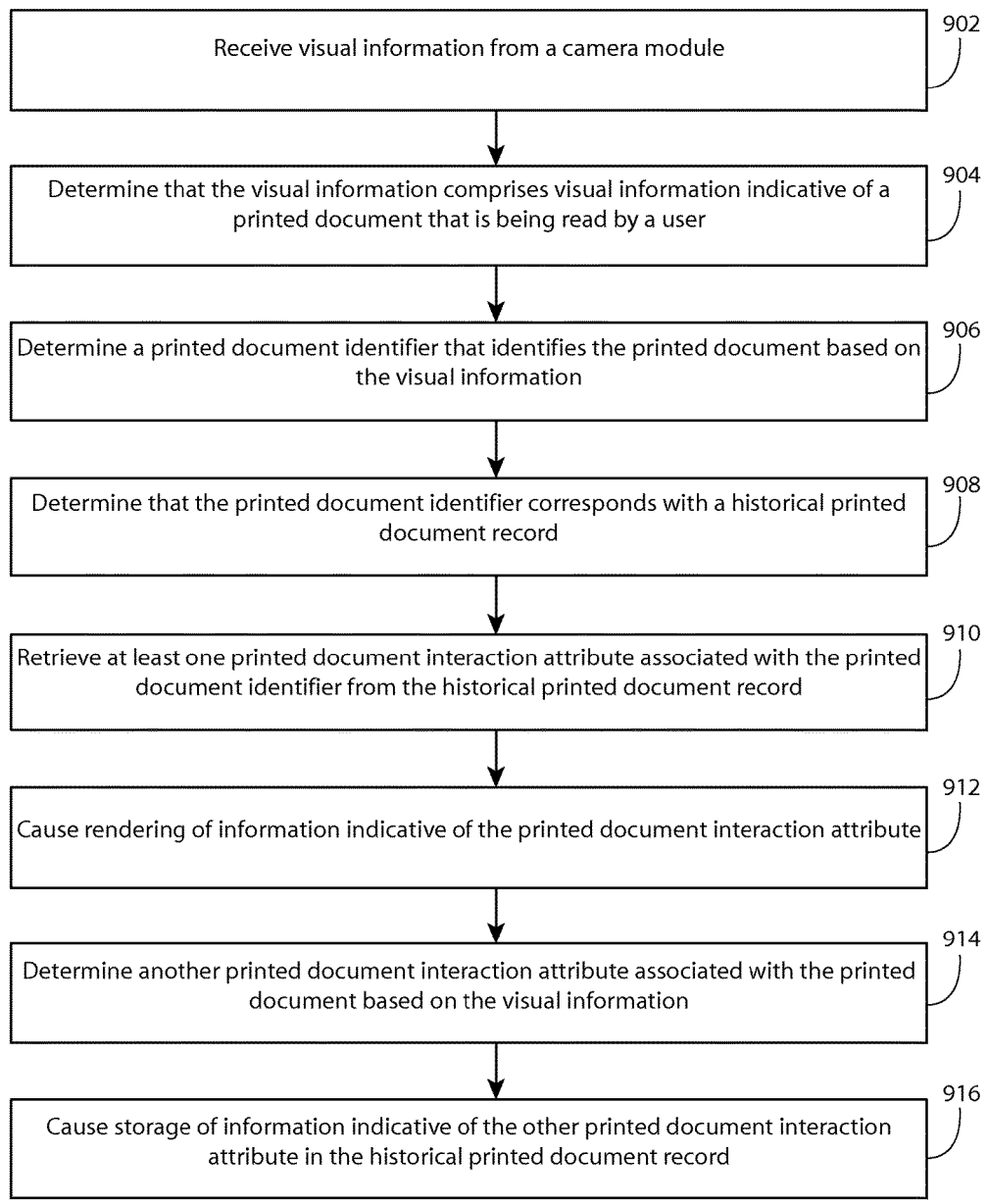
FIG. 9 is a flow diagram illustrating activities associated with causation of storage of information indicative of a printed document interaction attribute in a historical printed document record according to at least one example embodiment.

FIG. 9 is a flow diagram illustrating activities associated with causation of storage of information indicative of a printed document interaction attribute in a historical printed document record according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As discussed previously, in many circumstances, a user may continue reading a book that the user began reading previously. For example, the user may read portions of the book a few times per week. In such an example, it may be desirable to cause storage of information indicative of one or more printed document interaction attributes associated with the user reading the book. In this manner, the user may be reminded of information associated with the last interactions the user may have had with the book, for example, a most recently read page, a location, and/or the like.

At block 902, the apparatus receives visual information from a camera module. The receipt, the visual information, and the camera module may be similar as described regarding FIG. 2, FIG. 3, FIG. 4, and FIGS. 5A-5B.

At block 904, the apparatus determines that the visual information comprises visual information indicative of a printed document that is being read by a user. The determination, the printed document, the user, and the visual information indicative of the printed document being read by the user may be similar as described regarding FIG. 2, FIG. 3, FIG. 4, and FIGS. 5A-5B.

At block 906, the apparatus determines a printed document identifier that identifies the printed document based, at least in part, on the visual information. The determination and the printed document identifier FIG. 3, FIG. 4, and FIGS. 5A-5B.

At block 908, the apparatus determines that the printed document identifier corresponds with a historical printed document record. The determination and the historical printed document record may be similar as described regarding FIG. 3, FIG. 4, FIGS. 5A-5B, and FIGS. 6A-6D.

At block 910, the apparatus retrieves at least one printed document interaction attribute associated with the printed document identifier from the historical printed document record. The retrieval and the printed document interaction attribute may be similar as described regarding FIG. 3, FIG. 4, FIGS. 5A-5B, and FIGS. 6A-6D.

At block 912, the apparatus causes rendering of information indicative of the printed document interaction attribute. The causation, the rendering, and the information indicative of the printed document interaction attribute may be similar as described regarding FIG. 2, FIG. 3, FIG. 4, FIGS. 5A-5B, and FIGS. 6A-6D.

At block 914, the apparatus determines another printed document interaction attribute associated with the printed document based, at least in part, on the visual information. The determination and the other printed document interaction attribute may be similar as described regarding FIG. 3, FIG. 4, FIGS. 5A-5B, and FIGS. 6A-6D.

At block 916, the apparatus causes storage of information indicative of the other printed document interaction attribute in the historical printed document record. The causation and the storage may be similar as described regarding FIG. 3, FIG. 4, FIGS. 5A-5B, and FIGS. 6A-6D.

Figure 10:
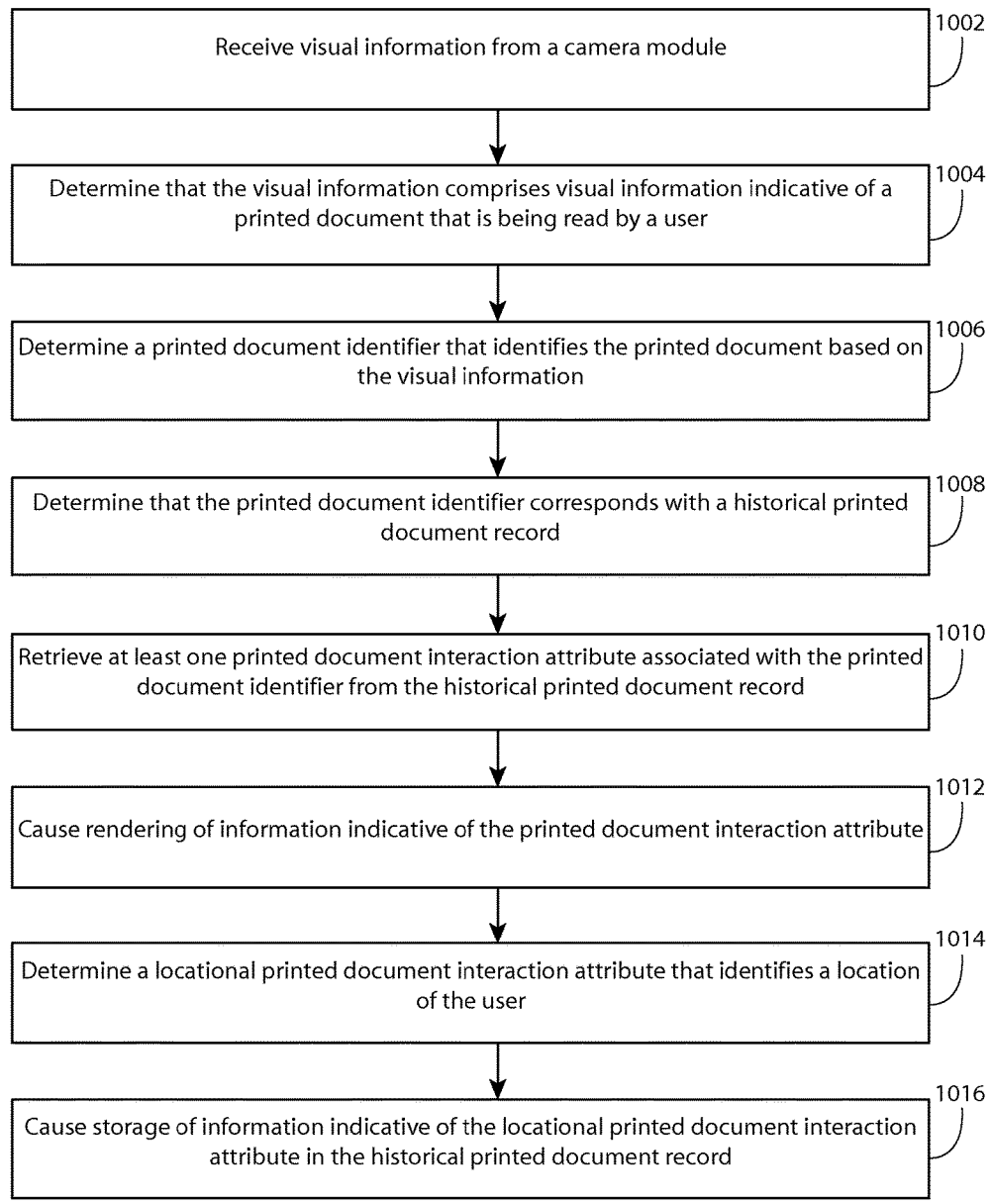
FIG. 10 is a flow diagram illustrating activities associated with causation of storage of information indicative of a locational printed document interaction attribute in a historical printed document record according to at least one example embodiment.

FIG. 10 is a flow diagram illustrating activities associated with causation of storage of information indicative of a locational printed document interaction attribute in a historical printed document record according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As discussed previously, in many circumstances, a user may continue reading a book that the user began reading previously. For example, the user may read a portion of a book while sitting in a coffee shop. In such an example, subsequent to reading the book, the user may read one or more different printed documents. In such an example, the user may later continue reading the book, and may desire to be reminded of information associated with the last interactions the user may have had with the book, for example, a geographical location of the last interaction with the book, a point of interest associated with the geographical location of the last interaction with the book, and/or the like. In such an example, it may be desirable to cause storage of information indicative of a locational printed document interaction attribute associated with the user reading the book.

At block 1002, the apparatus receives visual information from a camera module. The receipt, the visual information, and the camera module may be similar as described regarding FIG. 2, FIG. 3, FIG. 4, and FIGS. 5A-5B.

At block 1004, the apparatus determines that the visual information comprises visual information indicative of a printed document that is being read by a user. The determination, the printed document, the user, and the visual information indicative of the printed document being read by the user may be similar as described regarding FIG. 2, FIG. 3, FIG. 4, and FIGS. 5A-5B.

At block 1006, the apparatus determines a printed document identifier that identifies the printed document based, at least in part, on the visual information. The determination and the printed document identifier FIG. 3, FIG. 4, and FIGS. 5A-5B.

At block 1008, the apparatus determines that the printed document identifier corresponds with a historical printed document record. The determination and the historical printed document record may be similar as described regarding FIG. 3, FIG. 4, FIGS. 5A-5B, and FIGS. 6A-6D.

At block 1010, the apparatus retrieves at least one printed document interaction attribute associated with the printed document identifier from the historical printed document record. The retrieval and the printed document interaction attribute may be similar as described regarding FIG. 3, FIG. 4, FIGS. 5A-5B, and FIGS. 6A-6D.

At block 1012, the apparatus causes rendering of information indicative of the printed document interaction attribute. The causation, the rendering, and the information indicative of the printed document interaction attribute may be similar as described regarding FIG. 2, FIG. 3, FIG. 4, FIGS. 5A-5B, and FIGS. 6A-6D.

At block 1014, the apparatus determines a locational printed document interaction attribute that identifies a location of the user. The determination, the locational printed document interaction attribute, and the location of the user may be similar as described regarding FIG. 3, FIG. 4, FIGS. 5A-5B, and FIGS. 6A-6D.

At block 1016, the apparatus causes storage of information indicative of the locational printed document interaction attribute in the historical printed document record. The causation and the storage may be similar as described regarding FIG. 3, FIG. 4, FIGS. 5A-5B, and FIGS. 6A-6D.

Figure 11:
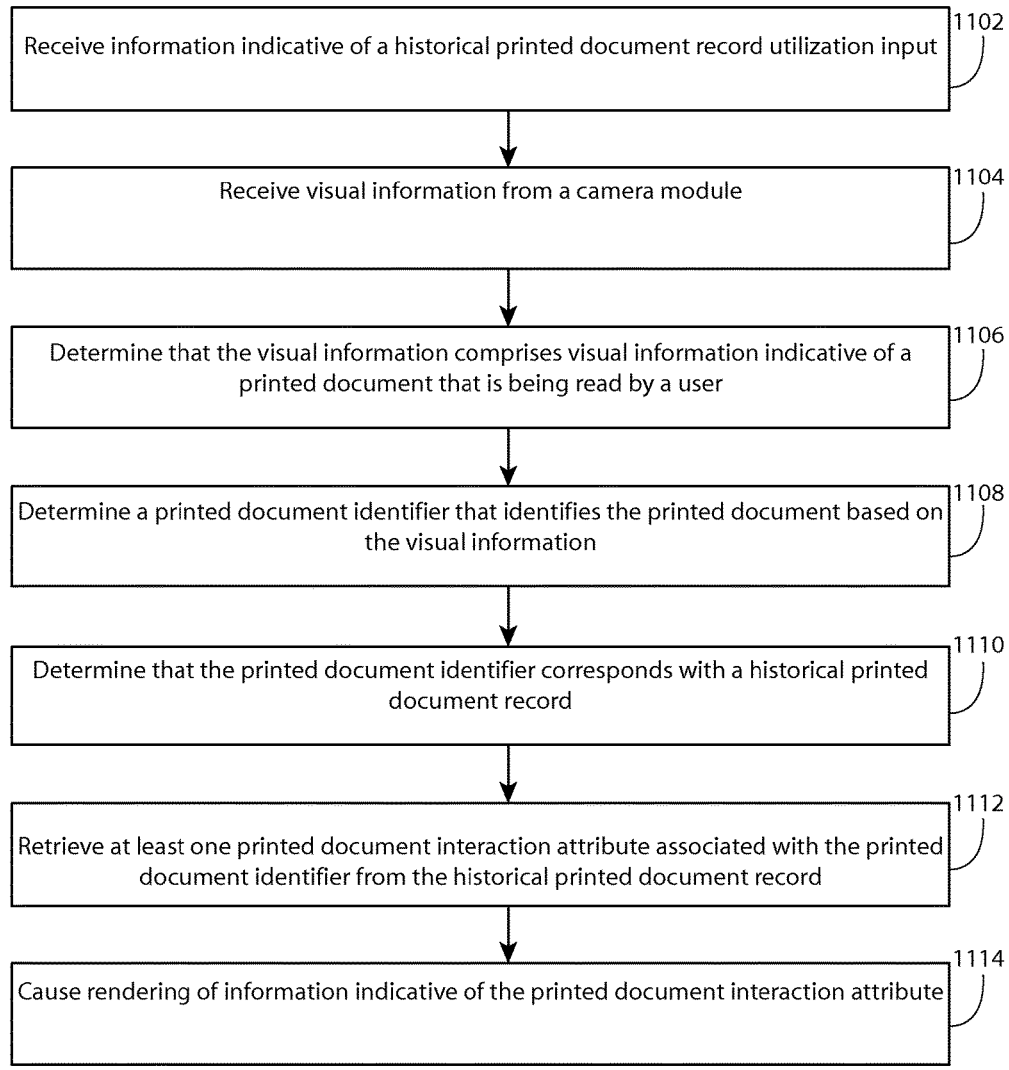
FIG. 11 is a flow diagram illustrating activities associated with causation of rendering of information indicative of a printed document interaction attribute according to at least one example embodiment.

FIG. 11 is a flow diagram illustrating activities associated with causation of rendering of information indicative of a printed document interaction attribute according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As discussed previously, in many circumstances, a user may continue reading a book that the user began reading previously. For example, the user may read portions of the book a few times per week. In such an example, the user's interactions with the book may be stored in a printed document record. In such an example, it may be desirable to permit a user to indicate a desire utilize the information stored within the printed document record. For example, the user may indicate a desire to utilize the information stored within the printed document record by way of a historical printed document record utilization input. In this manner, the user may be reminded of information associated with the last interactions the user may have had with the book, for example, a most recently read page, a location, and/or the like.

At block 1102, the apparatus receives information indicative of a historical printed document record utilization input. The receipt and the historical printed document record utilization input may be similar as described regarding FIG. 2, FIG. 3, FIG. 4, FIGS. 5A-5B, and FIGS. 6A-6D.

At block 1104, the apparatus receives visual information from a camera module. In at least one example embodiment, the activity illustrated in block 1104 may be performed subsequent to the activity illustrated in block 1102. In this matter, the activity illustrated in block 1104 may be caused by performance of the activity illustrated in block 1102. The receipt, the visual information, and the camera module may be similar as described regarding FIG. 2, FIG. 3, FIG. 4, and FIGS. 5A-5B.

At block 1106, the apparatus determines that the visual information comprises visual information indicative of a printed document that is being read by a user. In at least one example embodiment, the activity illustrated in block 1106 may be performed subsequent to the activity illustrated in block 1102. In this matter, the activity illustrated in block 1106 may be caused by performance of the activity illustrated in block 1102. The determination, the printed document, the user, and the visual information indicative of the printed document being read by the user may be similar as described regarding FIG. 2, FIG. 3, FIG. 4, and FIGS. 5A-5B.

At block 1108, the apparatus determines a printed document identifier that identifies the printed document based, at least in part, on the visual information. In at least one example embodiment, the activity illustrated in block 1108 may be performed subsequent to the activity illustrated in block 1102. In this matter, the activity illustrated in block 1108 may be caused by performance of the activity illustrated in block 1102. The determination and the printed document identifier FIG. 3, FIG. 4, and FIGS. 5A-5B.

At block 1110, the apparatus determines that the printed document identifier corresponds with a historical printed document record. In at least one example embodiment, the activity illustrated in block 1110 may be performed subsequent to the activity illustrated in block 1102. In this matter, the activity illustrated in block 1110 may be caused by performance of the activity illustrated in block 1102. The determination and the historical printed document record may be similar as described regarding FIG. 3, FIG. 4, FIGS. 5A-5B, and FIGS. 6A-6D.

At block 1112, the apparatus retrieves at least one printed document interaction attribute associated with the printed document identifier from the historical printed document record. The retrieval and the printed document interaction attribute may be similar as described regarding FIG. 3, FIG. 4, FIGS. 5A-5B, and FIGS. 6A-6D.

At block 1114, the apparatus causes rendering of information indicative of the printed document interaction attribute. The causation, the rendering, and the information indicative of the printed document interaction attribute may be similar as described regarding FIG. 2, FIG. 3, FIG. 4, FIGS. 5A-5B, and FIGS. 6A-6D.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1102 of FIG. 11 may be performed after block 1104 of FIG. 11, after block 1106 of FIG. 11, after block 1108 of FIG. 11, or after block 1110 of FIG. 11. Furthermore, if desired, one or more of the above-described functions may be optional or may be combined. For example, block 704 of FIG. 7 may be optional and/or combined with block 706 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor; and
   at least one memory comprising computer program code, the memory and the computer program code configured to, working with the processor, cause the apparatus to perform at least the following:
   via at least a camera module, receipt of visual information indicative of a printed document being viewed by a user through a see through display;
   determination of a printed document identifier based, at least in part, on the visual information received via the camera module;
   determination that the printed document identifier corresponds with a historical printed document record comprising information regarding previous user interactions with the printed document by the user during at least one previous session in which the user interacted with a document associated with the printed document identifier via the see through display or other see through display;
   retrieval, from the historical printed document record, of at least one printed document interaction attribute associated with the previous user interactions by the user with the printed document; and
   causation of rendering of information indicative of the printed document interaction attribute on the see through display according to the previous user interactions by the user with the printed document being viewed by the user through the see through display, such that the rendered information on the see through display corresponds to the printed document as provided in the historical printed document record.

2. The apparatus of claim 1, wherein the memory comprises computer program code configured to, working with the processor, cause the apparatus to perform:
   receipt of second visual information indicative of a second printed document being viewed through a see through display,
   determination of a second printed document identifier that identifies the second printed document based, at least in part, on the second visual information;

determination that the second printed document identifier fails to correspond with a stored historical printed document record;

determination of at least a second printed document interaction attribute associated with the second printed document based, at least in part, on the second visual information and a user interaction with the second printed document; and causation of storage of information indicative of the second printed document interaction attribute and the second printed document identifier in a new historical printed document record.

3. The apparatus of claim 1, wherein the memory comprises computer program code configured to, working with the processor, cause the apparatus to perform:

determination of another printed document interaction attribute associated with the printed document based, at least in part, on the visual information; and causation of storage of information indicative of the other printed document interaction attribute in the historical printed document record.

4. The apparatus of claim 3, wherein the determination of the other printed document interaction attribute comprises determination of a printed document interaction attribute type and a printed document interaction attribute value.

5. The apparatus of claim 1, wherein the determination of the other printed document interaction attribute associated with the printed document comprises determination of textual information based, at least in part, on the visual information, determination that the textual information corresponds with at least one visual printed document interaction attribute type, and setting of at least one visual printed document interaction attribute value based, at least in part, on the textual information.

6. The apparatus of claim 1, wherein the memory comprises computer program code configured to, working with the processor, cause the apparatus to perform:

determination of a locational printed document interaction attribute that identifies a location of the user; and causation of storage of information indicative of the locational printed document interaction attribute in the historical printed document record.

7. The apparatus of claim 1, wherein the memory comprises computer program code configured to, working with the processor, cause the apparatus to perform receipt of information indicative of a historical printed document record utilization input, wherein the receipt of visual information from the camera module is caused, at least in part, by the historical printed document record utilization input.

8. The apparatus of claim 1, wherein the memory comprises computer program code configured to, working with the processor, cause the apparatus to perform:

determination that a printed document reconfiguration has occurred;

determination of another printed document interaction attribute associated with the printed document based, at least in part, on the visual information; and causation of storage of information indicative of the other printed document interaction attribute in the historical printed document record.

9. The apparatus of claim 1, wherein the causation of rendering the information indicative of the printed document interaction attribute on the see through display comprises determining a position in which to render the information according to the previous user interactions by the user with the printed document such that the rendered information corresponds with one or more objects of the printed document being viewed by the user display through the see through display as the printed document interaction attribute corresponds with the printed document according to the historical printed document record.

10. The apparatus of claim 1, wherein retrieval of the at least one printed document interaction attribute comprises retrieval of a page printed document interaction attribute that is associated with a page identifier, a most recent page identifier or a most recently read page identifier.

11. A method comprising:

via at least a camera module, receiving visual information indicative of a printed document being viewed by a user through a see through display;

determining a printed document identifier based, at least in part, on the visual information received via the camera module;

determining that the printed document identifier corresponds with a historical printed document record comprising information regarding previous user interactions with the printed document by the user during at least one previous session in which the user interacted with a document associated with the printed document identifier via the see through display or other see through display;

retrieving, from the historical printed document record, at least one printed document interaction attribute associated with the previous user interactions by the user with the printed document; and causing rendering of information indicative of the printed document interaction attribute on the see through display according to the previous user interactions by the user with the printed document being viewed by the user through the see through display, such that the rendered information on the see through display corresponds to the printed document as provided in the historical printed document record.

12. The method of claim 11, further comprising:

receiving second visual information indicative of a second printed document being viewed through a see through display;

determining a second printed document identifier that identifies the second printed document based, at least in part, on the second visual information;

determining that the second printed document identifier fails to correspond with a stored historical printed document record;

determining at least a second printed document interaction attribute associated with the second printed document based, at least in part, on the second visual information; and causing storage of information indicative of the second printed document interaction attribute and the second printed document identifier in a new historical printed document record.

13. The method of claim 11, further comprising:

determining another printed document interaction attribute associated with the printed document based, at least in part, on the visual information; and causing storage of information indicative of the other printed document interaction attribute in the historical printed document record.

14. The method of claim 13, wherein determining the other printed document interaction attribute comprises determining a printed document interaction attribute type and a printed document interaction attribute value.

15. The method of claim 11, further comprising:
determining locational printed document interaction attribute that identifies a location of the user; and
causing storage of information indicative of the locational printed document interaction attribute in the historical printed document record.

16. The method of claim 11, further comprising:
determining that a printed document reconfiguration has occurred;
determining another printed document interaction attribute associated with the printed document based, at least in part, on the visual information; and
causing storage of information indicative of the other printed document interaction attribute in the historical printed document record.

17. At least one non-transitory computer-readable medium encoded with instructions that, when executed by a processor, perform:
via at least a camera module, receiving visual information from a camera module;
determining that the visual information comprises visual information indicative of a printed document that is being viewed by a user through a see through display;
determining a printed document identifier that identifies the printed document based, at least in part, on the visual information received via the camera module;
determining that the printed document identifier corresponds with a historical printed document record comprising information regarding previous user interactions with the printed document by the user during at least one previous session in which the user interacted with a document associated with the printed document identifier via the see through display or other see through display;
retrieving, from the historical printed document record, at least one printed document interaction attribute associated with the previous user interactions by the user; and
causing rendering of information indicative of the printed document interaction attribute on the see through display according to the previous user interactions by the user with the printed document being viewed by the user through the see through display, such that the rendered information on the see through display corresponds to the printed document as provided in the historical printed document record.

18. The medium of claim 17, further encoded with instructions that, when executed by a processor, perform:
receiving of second visual information indicative of a second printed document being viewed through a see through display;
determining a second printed document identifier that identifies the second printed document based, at least in part, on the second visual information;
determining that the second printed document identifier fails to correspond with a stored historical printed document record;
determining at least a second printed document interaction attribute associated with the second printed document based, at least in part, on the second visual information and a user interaction with the second printed document; and
causing storage of information indicative of the second printed document interaction attribute and the second printed document identifier in a new historical printed document record.

19. The medium of claim 17, further encoded with instructions that, when executed by a processor, perform:
determining another printed document interaction attribute associated with the printed document based, at least in part, on the visual information; and
causing storage of information indicative of the other printed document interaction attribute in the historical printed document record.

20. The medium of claim 17, further encoded with instructions that, when executed by a processor, perform:
determining locational printed document interaction attribute that identifies a location of the user; and
causing storage of information indicative of the locational printed document interaction attribute in the historical printed document record.

* * * * *